US008904997B2

(12) United States Patent
Watanabe et al.

(10) Patent No.: US 8,904,997 B2
(45) Date of Patent: Dec. 9, 2014

(54) FUEL INJECTION CONTROL SYSTEM FOR INTERNAL COMBUSTION ENGINE

(75) Inventors: Hiroki Watanabe, Nishio (JP); Naoki Toda, Nishio (JP); Shinya Hoshi, Obu (JP); Satoru Sasaki, Kariya (JP)

(73) Assignee: Denso Corporation, Kariya (JP)

( * ) Notice: Subject to any disclaimer, the term of this patent is extended or adjusted under 35 U.S.C. 154(b) by 366 days.

(21) Appl. No.: 13/539,747

(22) Filed: Jul. 2, 2012

(65) Prior Publication Data

US 2013/0000606 A1 Jan. 3, 2013

(30) Foreign Application Priority Data

Jul. 1, 2011 (JP) .................................. 2011-147309
Mar. 21, 2012 (JP) .................................. 2012-063621

(51) Int. Cl.
*F02D 41/40* (2006.01)
*F02D 35/02* (2006.01)
*F02D 41/00* (2006.01)
*F02M 61/18* (2006.01)

(52) U.S. Cl.
CPC ............ *F02D 35/023* (2013.01); *F02D 41/405* (2013.01); *F02D 41/402* (2013.01); *F02D 41/403* (2013.01); *F02D 41/0025* (2013.01); *F02M 61/1813* (2013.01); *Y02T 10/44* (2013.01)
USPC ......................................... 123/299; 701/104

(58) Field of Classification Search
CPC ... F02D 41/402; F02D 41/403; F02D 41/405; F02D 35/023
USPC .......... 123/299, 300, 304, 435, 478; 701/103, 701/104, 105
See application file for complete search history.

(56) References Cited

U.S. PATENT DOCUMENTS

| 6,964,256 | B2 * | 11/2005 | Kataoka et al. ................ 123/295 |
| 7,401,591 | B2 * | 7/2008 | Yamaguchi et al. ........... 123/299 |
| 7,831,370 | B2 * | 11/2010 | Kuronita et al. ............... 701/103 |
| 7,870,845 | B2 * | 1/2011 | Sasaki et al. ................... 123/435 |
| 2009/0055083 | A1 * | 2/2009 | Sasaki et al. ................... 701/104 |
| 2010/0312454 | A1 | 12/2010 | Nada et al. |

FOREIGN PATENT DOCUMENTS

| JP | 2001-254645 | 9/2001 |
| JP | 2006-183466 | 7/2006 |
| JP | 2009-138657 | 6/2009 |
| JP | 2009-299496 | 12/2009 |
| JP | 2010-196581 | 9/2010 |

OTHER PUBLICATIONS

Office Action (2 pages) dated Nov. 26, 2013, issued in corresponding Japanese Application No. 2012-063621 and English translation (2 pages).

* cited by examiner

*Primary Examiner* — Mahmoud Gimie
(74) *Attorney, Agent, or Firm* — Nixon & Vanderhye PC

(57) ABSTRACT

A fuel injection control system for an internal combustion engine is provided which is designed to perform pilot injection of fuel into the engine through a fuel injector prior to main injection. The system monitors a combustion state parameter representing a combustion state of the fuel within a combustion chamber of the engine which has been sprayed in the event of the pilot injection. When the combustion state parameter is determined as lying out of a stable combustion range where the fuel is to burn stably, the system changes the number of pilot injections to be executed prior to the main injection and/or the quantity of the fuel to be sprayed in each pilot injection, thereby enhancing the ignitability of the fuel in the pilot injection.

7 Claims, 18 Drawing Sheets

FUEL INJECTION CONTROL SYSTEM FOR INTERNAL COMBUSTION ENGINE

CROSS REFERENCE TO RELATED DOCUMENT

The present application claims the benefit of priority of Japanese Patent Application Nos. 2011-147309 and 2012-63621 filed on Jul. 1, 2011 and Mar. 21, 2012, the disclosures of which are incorporated herein by reference.

BACKGROUND

1. Technical Field

This disclosure relates generally to a fuel injection control system for internal combustion engines which is designed to perform multiple injections of fuel into the engine and ensure the stability of burning of the fuel.

2. Background Art

Multi-injection systems are known which are engineered to spray fuel into an internal combustion engine (which will be typically called pilot injection) just before a main injection event to facilitate the ignition of sprayed fuel, thus reducing engine noise and consumed quantity of fuel. The pilot injection is to spray an amount of fuel much smaller than that in the main injection one or several times per stroke in the engine. The use of fuel that is low in cetane number may, therefore, cause the ignition delay to increase, thus resulting in a decrease in burned amount of fuel sprayed in the pilot injection or misfire thereof.

Japanese Patent First Publication No. 2009-299496 discloses a multi-pilot injection system which works to control a time interval between events of the pilot injections. Specifically, the multi-pilot injection system is designed to determine the pilot-to-pilot injection interval so that a spray of fuel, as produced by a latter one of two consecutive pilot injections, may be out of overlap with the cool flame, as produced by the former one, thereby establishing full growth of the cool flame to ensure the stability of burning of a desired amount of fuel in each pilot injection.

The above multi-pilot injection system, however, is engineered on the assumption that the sprayed fuel must be burned. Accordingly, when the ambient temperature is low, the atmospheric pressure is low, or the cetane number of fuel used is low, that is, when the ignitability of the fuel is low, it may result in lack in ignition of the fuel, which leads to an increase in unburned amount of fuel in the events of the pilot injection.

SUMMARY OF THE INVENTION

It is therefore a principal object of the invention to provide a fuel injection control system for an internal combustion engine which is designed to ensure the stability of burning of a desired amount of fuel in the event of pilot-injection.

According to one aspect of the invention, there is provided a fuel injection control system for an internal combustion engine such as an automotive diesel engine. The fuel injection control system may be employed with a common rail system and comprises: (a) an injection quantity calculator which calculates a quantity of fuel to be sprayed from the fuel injector into the combustion chamber; (b) an injector driver which drives an operation of the fuel injector to spray the quantity of fuel, as calculated by the injection quantity calculator, in at least one event of pilot injection and in an event of main injection following the pilot injection; (c) a combustion state parameter acquiring circuit which acquires a combustion state parameter representing a combustion state of the fuel within the combustion chamber which has been sprayed in the event of the pilot injection; (d) a stable combustion determining circuit which determines whether the combustion state parameter, as acquired by the combustion state parameter acquiring circuit, lies in a stable combustion range where the fuel is to burn stably or not; and (e) a combusted amount controller which changes either the number of events of the pilot injection to be executed prior to the event of the main injection or the quantity of the fuel to be sprayed in each event of the pilot injection when the stable combustion determining circuit determines that the combustion state parameter is out of the stable combustion range.

Specifically, when it is determined that the fuel sprayed in the event of the pilot injection has not burned in a desired condition, the combusted amount controller works to control the number of events of the pilot injection or the quantity of fuel to be sprayed in each event of the pilot injection, thereby enhancing the ignitability of the fuel in the event of the pilot injection. A misfire of fuel in the event of the pilot injection may be avoided by increasing a total quantity of fuel to be sprayed in the event of the pilot injection. This, however, leads to an increase in unburned hydrocarbon (HC) arising from excessive diffusion of the fuel or engine noise. In order to eliminate such a drawback, the fuel injection control system changes the number of events of the pilot injection and/or the quantity of fuel to be sprayed in the event of the pilot injection to produce an enriched air-fuel mixture around the fuel injector, thereby facilitating the combustion of the fuel in the event of the pilot injection to ensure a desired combusted amount of the fuel.

In the preferred mode of the embodiment, when the stable combustion determining circuit determines that the combustion state parameter is out of the stable combustion range, the combusted amount controller increases the number of events of the pilot injection to be executed and decreases the quantity of the fuel to be sprayed in each event of the pilot injection. Such a decrease in quantity of the fuel results in a decrease in penetrating power or distance the spray of fuel will travel, so that the spray stays around the fuel injector immediately after being emitted from the fuel injector. However, multiple spraying events of fuel from the fuel injector will produce an enriched air-fuel mixture around the fuel injector, thus resulting in an increase in average equivalence ratio of the fuel which enhances the combustion of the fuel in the combustion chamber.

The combustion state parameter acquiring circuit may be equipped with a combusted amount determining circuit to determine a combusted amount of the fuel sprayed in the event of the pilot injection into the combustion chamber as the combustion state parameter.

The injector driver may be engineered to control the operation of the fuel injector to execute a first event and a second event of the pilot injection of the fuel into the combustion chamber prior to the event of the main injection. The fuel injection control system may also include a speed sensor which measures a speed of the engine, a flow velocity determining circuit which determines a flow velocity of a swirl of air sucked into the combustion chamber based on the speed of the engine, as measured by the speed sensor, and a pilot-to-pilot injection interval controller which controls a time interval between the first and second events of the pilot injection based on the flow velocity of the swirl, as determined by the flow velocity determining circuit, so as to overlap a spray of the fuel, as produced by the second event of the pilot injection, with a spray of the fuel, as produced by the first event of the pilot injection. Specifically, the fuel injection control system works to regulate the interval between the first and second events of the pilot injection to develop the overlap between the sprays, thereby producing an enriched air-fuel mixture around the fuel injector to enhance the combustion of the fuel in the combustion chamber.

The fuel injector may have a length and be equipped with a plurality of spray holes which are arrayed circumferentially around the length and produce sprays of the fuel radially. The pilot-to-pilot injection interval controller works to overlap the sprays of the fuel, as produced by the second event of the pilot injection, with those, as produced by the first event of the pilot injection.

When the speed of the engine, as measured by the speed sensor, is lower than a given value, in other words, the flow velocity of the swirl is not great enough to transport each of the sprays of fuel over another fuel spray, the pilot-to-pilot injection interval controller may control the time interval between the first and second events of the pilot injection so as to overlap the spray of the fuel to be jetted from each of the spray holes of the fuel injector in the second event of the pilot injection with that having emerged from the same one of the spray holes in the first event of the pilot injection. Specifically, when the flow velocity of the swirl is low, the spray of fuel emitted from each of the spray holes travels along a line extending in alignment with the axis of the same spray hole. The fuel injection control system, thus, jets the spray of fuel from each of the spray holes in the second event of the pilot injection toward that having been emitted from the same spray hole in the first event of the pilot injection. This produces enriched air-fuel mixtures around the fuel injector to enhance the combustion of the fuel in the combustion chamber.

Alternatively, when the speed of the engine, as measured by the speed sensor, is higher than the given value, the pilot-to-pilot injection interval controller may control the time interval between the first and second events of the pilot injection so as to overlap the spray of the fuel to be jetted from each of the spray holes of the fuel injector in the second event of the pilot injection with that having been emitted in the first event of the pilot injection from one of the spray holes which is different from that in the first event of the pilot injection. Specifically, when the flow velocity of the swirl is high, the spray of fuel emitted from each of the spray holes is usually transported by the swirl toward the line extending in alignment with the axis of another spray hole. The fuel injection control system, thus, overlap the spray of the fuel to be jetted from each of the spray holes of the fuel injector in the second event of the pilot injection with that having been emitted in the first event of the pilot injection from one of the spray holes which is different from that in the first event of the pilot injection. This produces enriched air-fuel mixtures around the fuel injector to enhance the combustion of the fuel in the combustion chamber.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
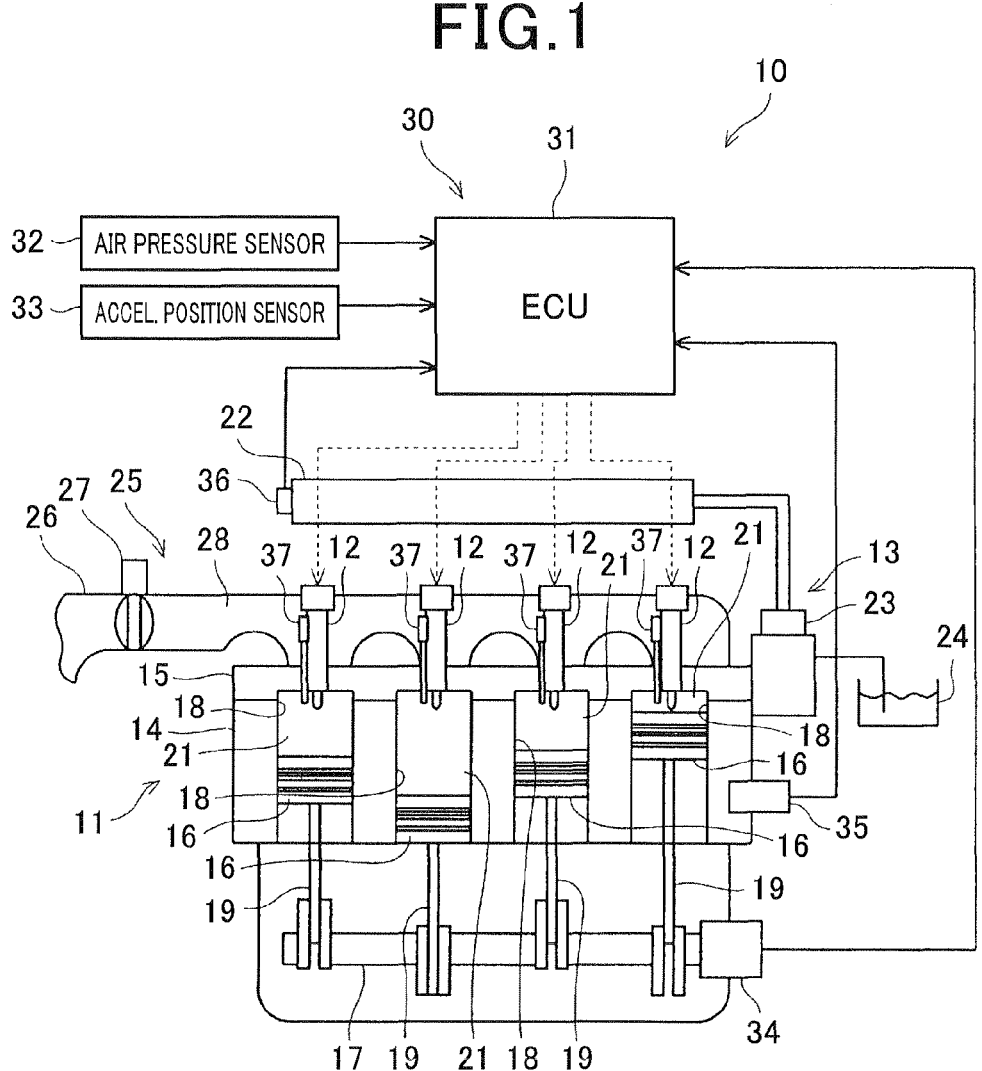
FIG. 1 is a schematic diagram which illustrates a diesel engine system equipped with a fuel injection control device of the first embodiment.

Referring to the drawings, wherein like reference numbers refer to like parts in several views, particularly to FIG. 1, there is shown a diesel engine system 10 according to the first embodiment which is engineered as a common rail multi-fuel injection system for internal combustion diesel engines mounted in automotive vehicles.

The diesel engine system 10 includes a diesel engine 11, fuel injectors 12, and a fuel supply system 13. The diesel engine 11 is equipped with a cylinder block 14, a cylinder head 15, pistons 16, and a crankshaft 17. The cylinder block 14 has a plurality of cylinders 18 formed therein. The cylinder head 15 is mounted on an end surface of the cylinder block 14. Each of the pistons 16 is disposed within one of the cylinders 18 to be reciprocable in an axial direction of the cylinders 18. The crankshaft 17 is disposed inside the cylinder block 14 in mechanical connection with the pistons 16 through a connecting rod 19. The reciprocating motion of the pistons 16 is converted into rotation of the crankshaft 17 through the connecting rod 19. Inner walls of the cylinder block 14 defining the cylinders 18, an inner wall of the cylinder head 15, and end surfaces of the pistons 16 form combustion chambers 21.

The fuel injectors 12 pass through the cylinder head 15 with head thereof exposed to the combustion chambers 21, respectively. The fuel supply system 13 is equipped with a common rail 22, a fuel injection pump 23, and a fuel tank 24. The fuel injection pump 23 works to suck fuel from the fuel tank 24 and pressurize and feed it to the common rail 22. The common rail 22 serves as a fuel accumulator to store therein the fuel, as supplied from the fuel injection pump 23, at a controlled pressure level. The common rail 22 connects with the fuel injectors 12 and feeds the fuel thereto.

The diesel engine system 10 also includes an intake system 25 and an exhaust system (not shown). The intake system 25 is equipped with an intake pipe 26 and a throttle 27. The intake pipe 26 has formed therein an intake path 28 which communicates at one of ends thereof to the combustion chambers 28 and is exposed at the other end to air. The throttle 27 works to open or close the intake path 28 to control a flow of intake air. The exhaust system is equipped with an exhaust pipe and an emission control device. The exhaust pipe has formed therein an exhaust path which communicates one of ends thereof to the combustion chambers 21 and is exposed at the other end to air. The exhaust emission device is disposed in a portion of the exhaust path to control emissions from the combustion chambers 21.

The diesel engine system 10 also includes a fuel injection control device 30 equipped with an electronic control unit (ECU) 31. The ECU 30 connects electrically with an atmospheric pressure sensor 32, an accelerator position sensor 33, a speed sensor 34, a coolant temperature sensor 35, and a pressure sensor 36. The atmospheric pressure sensor 32 measures the atmospheric pressure in an environment in which the diesel engine system 10 is to operate and outputs an electric signal indicative thereof to the ECU 31. The accelerator position sensor 33 measures the position of an accelerator pedal (not shown) mounted in the vehicle which is a function of a driver's effort on the accelerator pedal and outputs an electrical signal indicative thereof to the ECU 31. The speed sensor 34 measures the speed of the crankshaft 17 of the engine 11 and outputs an electric signal indicative thereof to the ECU 31. The coolant temperature sensor 35 measures the temperature of coolant for the engine 11 and outputs an electric signal indicative thereof to the ECU 31. The pressure sensor 36 measures the pressure of fuel in the common rail 22 and outputs an electric signal indicative thereof to the ECU 31. The ECU 31 also connects with cylinder pressure sensors 37 which are mounted one in each of the combustion chambers 21. Each of the cylinder pressure sensors 37 measures the pressure in a corresponding one of the combustion chambers 21 and outputs an electric signal indicative thereof to the ECU 31.

Figure 2:
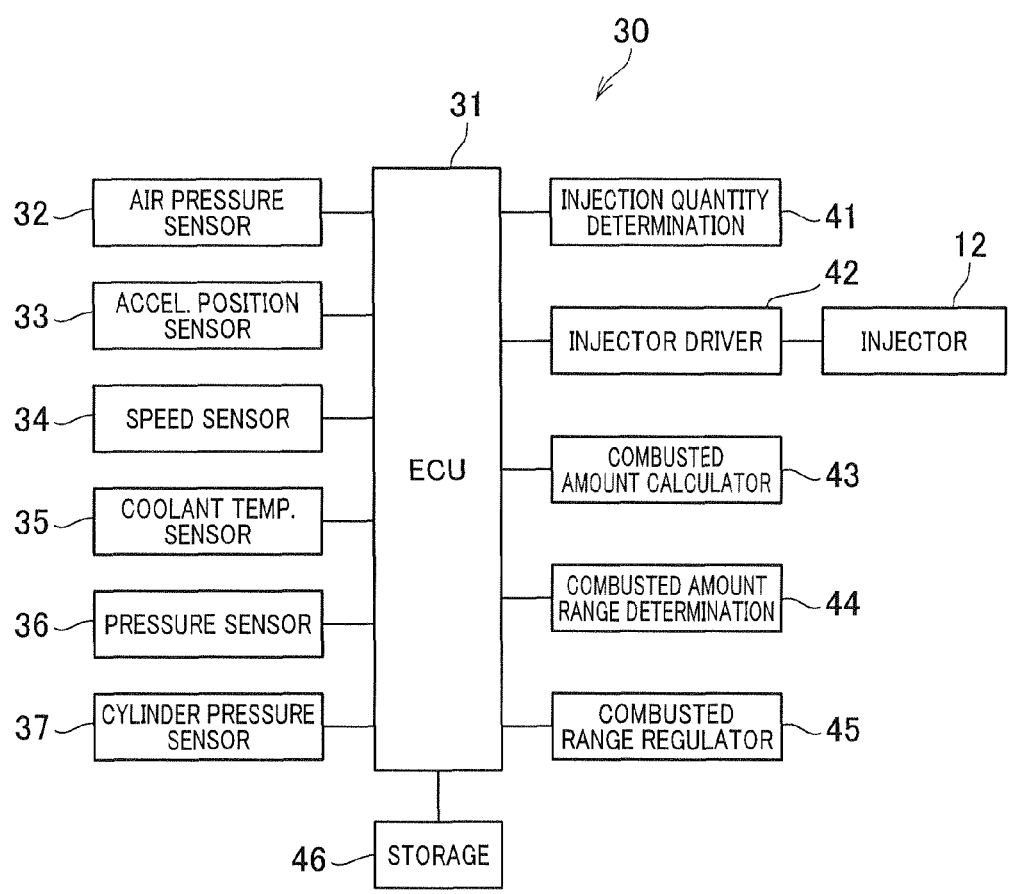
FIG. 2 is a block diagram which shows the fuel injection control device, as illustrated in FIG. 1.

The ECU 31 is implemented by a microcomputer (not shown) made up of a CPU, a ROM, and a RAM. The ECU 31 works to execute computer programs, as stored in the ROM to control the whole operation of the diesel engine system 10. Specifically, the ECU 31 executes the computer programs to functionally construct, as illustrated in FIG. 2, an injection quantity calculator 41, an injector driver 42, a combusted amount-of-fuel calculator 43, a combusted amount range determining circuit 44, and a combusted amount regulator 45. The injection quantity calculator 41, the injector driver 42, the combusted amount-of-fuel calculator 43, the combusted amount range determining circuit 44, and the combusted amount regulator 45 may alternatively be implemented by hardware. The ECU 31 also connects with a storage device 46 which is implemented by, for example, a non-volatile memory. The storage device 46 may be shared with the ROM and the RAM of the ECU 31.

The injection quantity calculator 41 calculates a target quantity of fuel to be sprayed from each of the fuel injectors 12 into a corresponding one of the combustion chambers 21. Specifically, the injection quantity calculator 41 analyzes an output of the accelerator position sensor 33 and the speed of the crankshaft 17, as measured by the speed sensor 34 to determine an injection quantity Q of fuel. The injection quantity calculator 41 also corrects the injection quantity Q based on the atmospheric pressure, as measured by the atmospheric pressure sensor 32, the temperature of coolant, as measured by the coolant temperature sensor 35, and injection characteristics of a corresponding one of the fuel injectors 12 to determine a target injection quantity Qd that is the quantity of fuel to be sprayed from the one of the fuel injectors 12. The injection quantity calculator 41 also divides the target injection quantity Qd into a main injection quantity Qm that is the quantity of fuel to be sprayed in an event of the main injection (i.e., a single main injection) and a pilot-injection quantity Qp that is the quantity of fuel to be sprayed in an event of the pilot-injection (i.e., a single pilot injection). The main injection quantity Qm is smaller than the pilot-injection quantity Qp.

The injector driver 42 works to control an operation of each of the fuel injectors 12 to spray the target injection quantity Qd, as determined by the injection quantity calculator 41. Specifically, the injector driver 42 outputs a drive signal to an electromagnetic actuator (not shown) of each of the fuel injectors 12 to open a spray hole thereof. The fuel injector 12 works to spray the pilot-injection quantity Qp and the main injection quantity Qm in sequence into the engine 11. The main injection quantity Qm is most of the target injection quantity Qd of fuel to be sprayed per stroke, that is, in each engine combustion cycle (i.e., a four-stroke cycle) including intake or induction, compression, expansion, and exhaust. The pilot-injection quantity Qp of fuel is the target injection quantity Qd minus the main injection quantity Qm and to be sprayed in the event of the pilot-injection just before the event of the main injection. The fuel injection control device 30 may be engineered to perform a pre-injection prior to the pilot injection and/or an after-injection following the main injection. In this case, the pilot-injection quantity Qp is the target injection quantity Qd minus the sum of the main injection quantity Qm and the quantity of fuel to be sprayed in the events of pre-injection and/or the after-injection.

The combusted amount-of-fuel calculator 43 works to calculate the amount of fuel which has been combusted in each of the combustion chambers 21 as a parameter representing a combustion state of fuel sprayed from each of the fuel injectors 12. Specifically, the combusted amount-of-fuel calculator 43 monitors the pressure in each of the combustion chambers 21, as measured by the cylinder pressure sensor 37, and calculates the amount of fuel combusted in each of events of the main injection and the pilot injection. Usually, the pressure in each of the combustion chambers 21 is elevated by combustion of fuel sprayed from the fuel injector 12. In other words, the pressure in the combustion chamber 21 correlates with the combusted amount of fuel sprayed from the fuel injector 12, thus enabling the combusted amount-of-fuel calculator 43 to use the pressure in the combustion chamber 21, as measured by the cylinder pressure sensor 37, to determine the amount of fuel combusted in the combustion chamber 21. The combusted amount-of-fuel calculator 43 and the cylinder pressure sensors 37 serve as a combusted amount-of-fuel determining circuit.

The combusted amount range determining circuit 44 serves to determine whether the combusted amount of fuel which has been sprayed in the event of the pilot injection, as calculated by the combusted amount-of-fuel calculator 43, lies within a given permissible range where the fuel is to burn stably or not. The burning of fuel sprayed in the event of the pilot injection will, as described above, result in an elevation in pressure in the combustion chamber 21. A lack of ignition of the fuel within the combustion chamber 21 may, however, arise from properties of the fuel, especially, distillation properties or cetane number, so that the combusted amount of the fuel will be out of the given permissible range. This range is set based on characteristics of the engine 11 and the fuel injectors 12 and stored in the storage device 46. The combusted amount range determining circuit 44 is, therefore, designed as a stable combustion determining circuit to decide whether the combusted amount of fuel which has been sprayed in the event of the pilot injection and represents the combustion state of fuel in the combustion chamber 21 is within a stable combustion range (i.e., the given permissible range stored in the storage device 46) or not.

When the combusted amount range determining circuit 44 has decided that the combusted amount of fuel which has been sprayed in the event of the pilot injection is out of the given permissible range, the combusted amount regulator 45 works as a combusted amount controller to change the number of the pilot injections to be executed in the engine combustion cycle and/or the amount of fuel to be sprayed in each event of the pilot injection. In this embodiment, when the combusted amount range determining circuit 44 has determined that the combusted amount of fuel is out of the permissible range, meaning that it is insufficient, the combusted amount regulator 45 increases the number of the pilot injection to be executed in each of the engine combustion cycle and decreases the amount of fuel to be sprayed in each event of the pilot injection.

Figure 3:
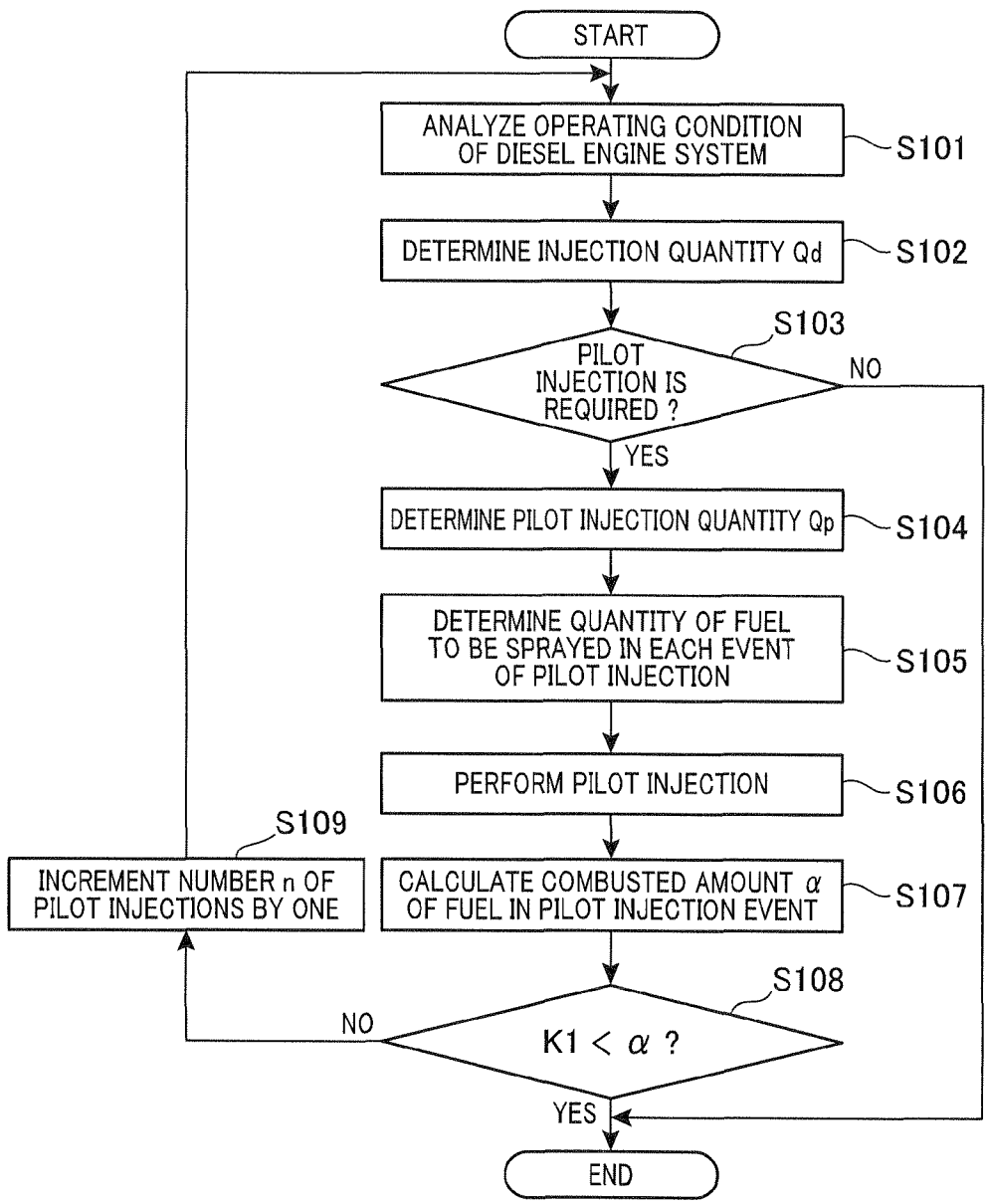
FIG. 3 is a flowchart of a sequence of logical steps or program to be executed by the fuel injection control device of FIG. 2 to control spraying of fuel in an event of pilot injection.

The above operations of the diesel engine system 10 will be described below with reference to a flowchart of a fuel injection control program, as illustrated in FIG. 3.

Upon start of the diesel engine system 10, the ECU 31 initiates the program.

First, in step S101, the ECU 31 samples an operating condition of the diesel engine system 10 at a regular interval. Specifically, the ECU 31 analyzes the output of the accelerator position sensor 33 indicating the position of the accelerator pedal (i.e., an open position of the throttle 27) and the speed of the engine 11, as measured by the speed sensor 34 to determine the degree of required load on the engine 11.

The routine then proceeds to step S102 wherein the injection quantity calculator 41 determines the injection quantity Q of fuel based on the operating condition of the diesel engine system 10, as derived in step S101. The injection quantity calculator 41 also corrects the injection quantity Q based on the atmospheric pressure, as measured by the atmospheric pressure sensor 32, the temperature of coolant, as measured by the coolant temperature sensor 35, and injection characteristics of the fuel injectors 12 to determine the target injection quantity Qd. The routine then proceeds to step S103 wherein it is determined whether it is now required to perform the pilot injection of fuel or not. For instance, when the diesel engine system 10 is operating at a low load condition, the ECU 31 (i.e., the injection quantity calculator 41) determines that the pilot injection is not necessary.

If a YES answer is obtained in step S103 meaning that the pilot injection of fuel needs to be executed, then the routine proceeds to step S104 wherein the injection quantity calculator 41 determines the pilot-injection quantity Qp of fuel to be sprayed in the event of the pilot injection. Specifically, the injection quantity calculator 41 divides the target injection quantity Qd into the main injection quantity Qm and pilot-injection quantity Qp. The injection quantity calculator 41 divides the pilot-injection quantity Qp by the number n of events of the pilot injection (i.e., the number of sequential discrete shots of fuel prior to the main injection) to be executed in the engine combustion cycle to determine a pilot-injection quantity Qpx that is the quantity of fuel to be sprayed in each event of the pilot injection. An initial value of the number n of the pilot injections to be executed in each engine combustion cycle is set to one (1). Alternatively, if a NO answer is obtained in step S103 meaning that the pilot injection does not need to be executed, then the routine terminates.

After step S105, the routine proceeds to step S106 wherein the injector driver 42 opens each of the fuel injectors 12 to spray the pilot-injection quantity Qpx, as determined by the injection quantity calculator 41. Specifically, the injector driver 42 outputs the drive signal to the fuel injector 12 to open the spray hole for a period of time corresponding to the pilot-injection quantity Qpx. The fuel injector 12 the sprays the pilot-injection quantity Qpx into the combustion chamber 21 in one event of the pilot injection.

After the fuel injector 12 sprays the fuel in step S106, then the routine proceeds to step S107 wherein the combusted amount-of-fuel calculator 43 calculates a combusted amount a of fuel that is the amount of fuel having burned in the combustion chamber 21 as a combustion state parameter. Specifically, the combusted amount-of-fuel calculator 43 samples an output of a corresponding one of the cylinder pressures 37 which represents the pressure in the combustion chambers 21 in which the fuel sprayed in the event of the pilot injection in step S106 has been burned and calculates the combusted amount a of fuel as a function of the sampled pressure in the combustion chamber 21 and the pilot-injection quantity Qpx. The fuel sprayed from the fuel injector 12 will be burned in the combustion chamber 21. The pressure in the combustion chamber 21 is, thus, elevated by the burning of the fuel in addition to a decrease in volume of the combustion chamber 21 arising from movement of the piston 16 from the bottom dead center to the top dead center. The movement of the piston 16 will result in a regular change in pressure in the combustion chamber 21 as a function of the angular position of the crankshaft 17, while a rise in pressure in the combustion chamber 21 due to the burning of the fuel is irregular. It is, therefore, easy to acquire a component of the output of the cylinder pressure sensor 37 which represents a change in pressure in the combustion chamber 21 resulting from the burning of the fuel. Such a pressure change has a correlation to the amount of fuel burned in the combustion chamber 21. In other words, the more the amount of fuel burned in the combustion chamber 21, the greater will be the change in pressure in the combustion chamber 21. The determination of the combusted amount a of fuel is, therefore, achieved based on the pilot-injection quantity QPx that is the quantity of fuel sprayed in one event of the pilot injection and the pressure in the combustion chamber 21, as measured by the cylinder pressure 37. The combusted amount-of-fuel calculator 43, as described above, calculates the combusted amount a of fuel based on the pilot-injection quantity Qpx and the pressure in the combustion chamber 21, as measured by the cylinder pressure 37.

After step S107, the routine proceeds to step S108 wherein it is determined whether the combusted amount a of fuel, as derived in step S107, lies in a proper range or not. Specifically, the combusted amount range determining circuit 44 determines whether the combusted amount a is greater than a given lower limit K1, as stored in the storage device 46, or not.

If a YES answer is obtained in step S108 meaning that the combusted amount a is greater than a given lower limit K1, it is concluded that the fuel has been ignited properly. The routine then terminates. Alternatively, if a NO answer is obtained meaning that the combusted amount a is lower than or equal to the lower limit K1, then the routine proceeds to step S109 wherein the number n of events of the pilot injection to be performed in each engine combustion cycle is incremented by one.

After the number n of events of the pilot injections is changed to n+1, the routine returns back to step S101. The ECU 31 performs the above sequence of operations again. In step S105, the injection quantity calculator 41 divides the pilot-injection quantity Qp, as derived in step S104, by n+1 that is the number of events of the pilot injection, as determined in step S109, to calculate the pilot-injection quantity Qpx. In step S106, the ECU 31 performs events of the pilot injection which are greater in number than those one program execution cycle earlier by one. The quantity of fuel to be sprayed in each event of the pilot injection is smaller than that one program execution cycle earlier.

The operation of the diesel engine system 10 will also be described below.

The fuel sprayed from the fuel injector 12 will reach farther as the quantity of fuel sprayed or the length of time the fuel is sprayed increases. In other words, a spray of a large quantity of fuel for a long period of time will be great in penetrating power. Conversely, a spray of a small quantity of fuel for a short period of time such as a spray of fuel to be produced by the pilot injection will be small in penetrating power, so that it stays around the fuel injector 12. This is because as the quantity of fuel sprayed or the injection period decreases, a fuel path defined by a gap between a needle valve and a valve seat (not shown) of the fuel injector 12 will be small in size. When the quantity of fuel is small, and/or the injection period is short, the fuel to be delivered to the spray hole of the fuel injector 12 usually passes through a small gap between the needle valve and the valve seat, so that the flow velocity of the fuel will be decreased by an operation of the orifice (i.e., the small gap), thus resulting in a decrease in kinetic energy of the fuel emitted from the spray hole of the fuel injector 12. This will cause the fuel to stay around the fuel injector 12 without being jetted farther.

Figure 4:
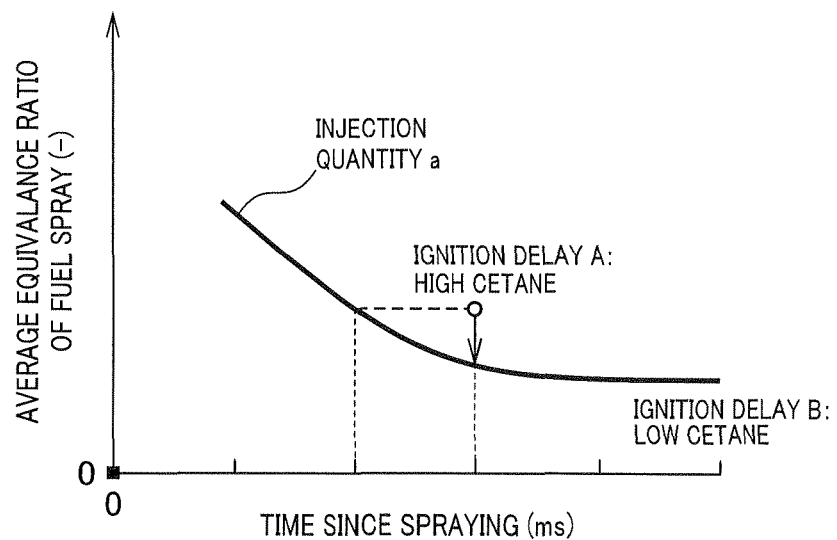
FIG. 4 is a graph which demonstrates a relation between an average equivalence ratio of fuel sprayed from a fuel injector and a time since the fuel starts to be sprayed from the fuel injector.
Figure 5:
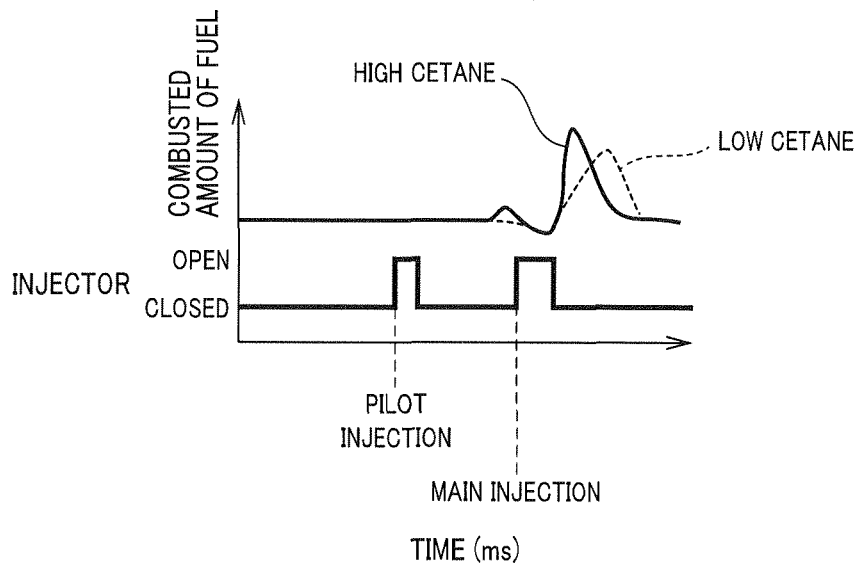
FIG. 5 is a graph which demonstrates a variation in combusted amount of fuel in terms of a cetane number of the fuel.

FIG. 4 is a graph which demonstrates a relation between an average equivalence ratio of fuel sprayed from the fuel injector 12 and the time since the fuel starts to be sprayed from the fuel injector 12. The graph shows that the average equivalence ratio drops with an increase in time since the fuel starts to be sprayed increases. An increase in ignition delay that is the time between spraying of fuel and ignition thereof will, therefore, cause the fuel sprayed from the fuel injector 12 to be mixed with air in the combustion chamber 21, so that the average equivalence ratio thereof decreases. The decrease in equivalence ratio of the fuel will result in a deterioration in ignitability of the fuel in the combustion chamber 21. A time lag between when fuel is sprayed into the combustion chamber 21 (i.e., the injection timing) and when the heat is generated by burning of the fuel in the combustion chamber 21, as can be seen from FIG. 5, depends upon the ignition delay. The ignition delay, as described above, results in a decrease in average equivalence ratio of the fuel, which will lead to a deterioration in ignitability of the fuel, that is, a decrease in heat generated. Particularly, the fuel that is lower in cetane number, as indicated by a broken line in FIG. 5, undergoes a great decrease in average equivalence ratio due to the ignition delay. Specifically, the ignitability of fuel that is higher in cetane number is maintained even when the average equivalence ratio of the fuel is decreased by the ignition delay in the event of the pilot injection, so that the heat is generated by burning of the fuel in the combustion chamber 21. In contrast, a decrease in average equivalence ratio of fuel that is lower in cetane number depends greatly upon the ignition delay in the event of the pilot injection, which may result in a misfire of the fuel in the combustion chamber 21.

An increase in quantity of fuel sprayed in order to reduce the possibility of the misfire in the event of the pilot injection will result in excess diffusion of the fuel in the combustion chamber 21, which may lead to an increase in unburned hydrocarbon (HC). The increase in quantity of fuel sprayed in the event of the pilot injection may also result in an overlap between events of the pilot injection and the main injection, thus contributing to an increase in total combusted amount of the fuel, which results in an increase in level of combustion noise.

Figure 6:
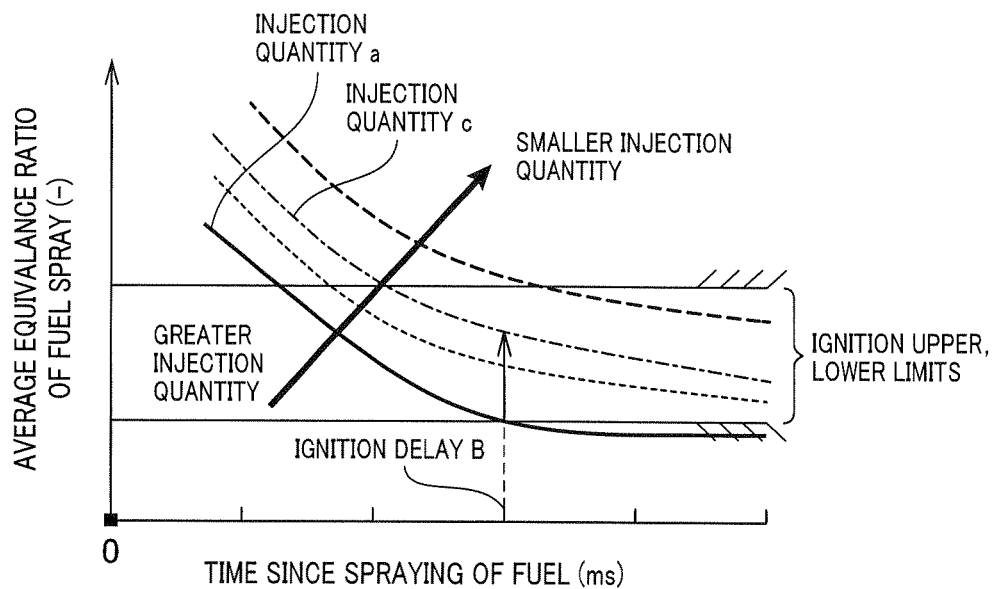
FIG. 6 is a graph which represents a variation in average equivalence ratio of fuel in terms of the quantity of the fuel sprayed.
Figure 7:
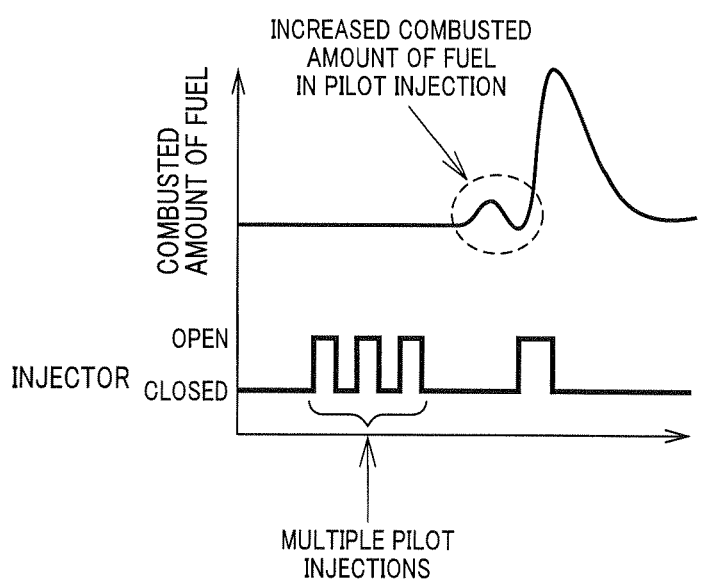
FIG. 7 is a graph which represents a change in combusted amount of fuel in terms of the number of events of pilot injection.

In order to eliminate the above problem, the fuel injection control device 30 of this embodiment is designed to increase the number of events of the pilot injection without changing a total quantity of fuel to be sprayed in a sequence of events of the pilot injection, in other words, while decreasing the quantity of fuel to be sprayed in each event of the pilot injection. As demonstrated in FIG. 6, a decrease in quantity of fuel to be sprayed in one event of the pilot injection will result in an increase in average equivalence ratio of the fuel. Therefore, in the case of fuel whose ignition delay B is longer than that of fuel whose cetane number is greater, a decrease in quantity of the fuel to be sprayed in one event of the pilot injection also results in an increase in equivalence ratio thereof. This is because when the quantity of fuel to be sprayed in each event of the pilot injection is decreased, while the number of events of the pilot injection is increased, the fuel sprayed from the fuel injector 12, as described above, tends to stay around the fuel injector 12, so that a richer air-fuel mixture is produced near the fuel injector 12. This ensures a desired degree of ignitability of fuel whose cetane number is low without need for increasing the total quantity of the fuel to be sprayed before the event of the main injection. The burning of fuel sprayed in a sequence of events of the pilot injection is, as demonstrated in FIG. 7, facilitated, thus resulting in an increase in combusted amount of the fuel.

As described above, when it is determined that the combusted amount of fuel which has been sprayed in the event of the pilot injection lies out of the permissible range, the combusted amount regulator 45 increases the number of events of the pilot injection to be executed in the engine combustion cycle and decreases the amount of fuel to be sprayed in each event of the pilot injection. In other words, when it is determined that the combusted amount of fuel sprayed in the event(s) of the pilot injection is insufficient, the combusted amount regulator 45 works to increase the number of a sequence of events of the pilot injection (i.e., the number of sequential discrete pilot injections) while decreasing the quantity of fuel to be sprayed in each event of the pilot injection to produce a richer air-fuel mixture around the fuel injector 12. Therefore, even when the cetane number of fuel used is low, the stability in burning of the fuel sprayed in a sequence of events of the pilot injection is ensured.

A modification of the fuel injection control device 30 will be described below.

The fuel injection control device 30 of the first embodiment is designed to calculate in step S107 the combusted amount a of fuel sprayed in an event(s) of the pilot injection and control the number of events of the pilot injection only based on the combusted amount a of fuel. The fuel injection control device 30 of this modification is engineered to change the number n of events of the pilot injection as a function of another parameter.

Figure 8:
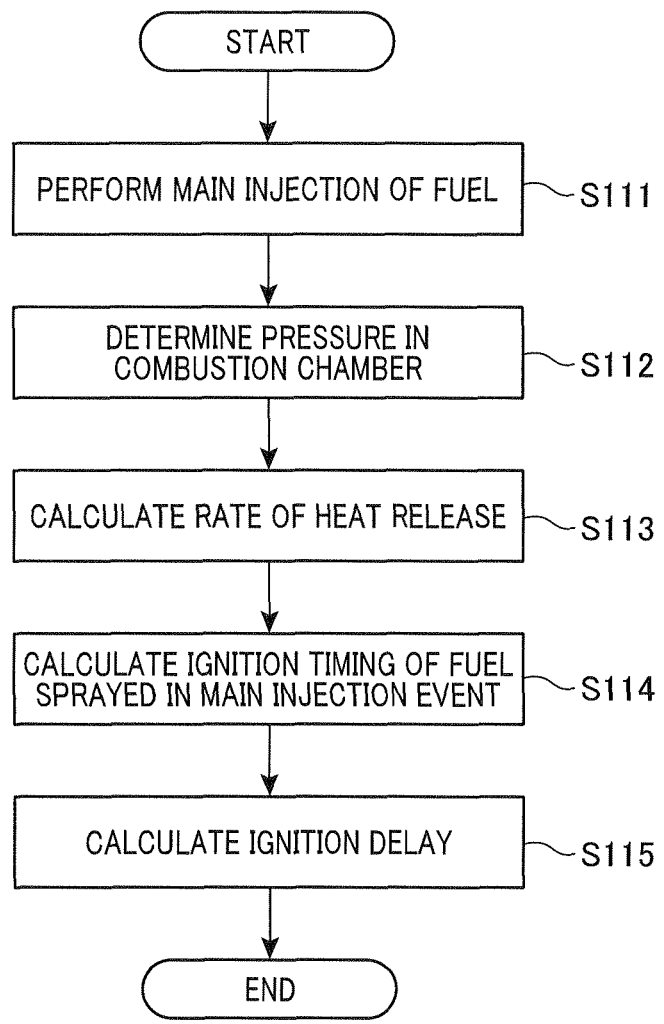
FIG. 8 is a flowchart of a fuel injection control program to be executed by the first modification of the first embodiment.

For instance, the ECU 31 is designed to perform a sequence of operations, as illustrated in FIG. 8, instead of step S107 of FIG. 3. Specifically, after the pilot injection of fuel is performed in step S106 of FIG. 3, the routine proceeds to step S111 wherein the injector driver 42 performs the main injection of fuel into the engine 11. The routine proceeds to step S112 wherein the combusted amount-of-fuel calculator 43 samples an output of a corresponding one of the cylinder pressures 37 which represents the pressure in the combustion chambers 21 in which the fuel sprayed in the event of the main injection in step S111 has been burned. The routine proceeds to step S113 wherein the combusted amount-of-fuel calculator 43 calculates the rate of heat release based on the pressure in the combustion chamber 21, as derived in step S112. The rate of heat release represents a change in amount of heat as a function of an angular position of the crankshaft 17 of the engine 11.

The routine proceeds to step S114 wherein the combusted amount-of-fuel calculator 43 determines the ignition timing that is the instant when the main injection of fuel was performed based on the rate of heat release, as calculated in step S113. Specifically, when the main injection of fuel is performed by the fuel injector 12, the fuel is ignited in the combustion chamber 21 so that it burns. This results in a sudden change in rate of heat release, as calculated in step S113. The combusted amount-of-fuel calculator 43 calculates the ignition timing of the fuel sprayed in the event of the main injection as a function of the change in rate of heat release. The routine then proceeds to step S115 wherein the combusted amount-of-fuel calculator 43 also calculates the ignition delay of the fuel sprayed in the main injection event based on the ignition timing, as derived in step S114. The ignition delay is a time interval between start of the main injection of fuel from the fuel injector 12 into the combustion chamber 21 and ignition of the fuel in the combustion chamber 21. Usually, as the cetane number of fuel, the temperature of the coolant of the engine 11, or the atmospheric pressure decreases, the ignition delay of fuel sprayed in the main injection event will increase. In such a condition where the ignition delay in the main injection event increases, there is a high possibility that the ignition delay of fuel sprayed in the pilot injection event occurs, which results in instability of burning of the fuel. After step S115, the routine proceeds to step S108 of FIG. 3 wherein the combusted amount range determining circuit 44 determines whether the ignition delay of fuel sprayed in the main injection event, as calculated in step S115, is shorter than an ignition delay upper limit or not. If a YES answer is obtained meaning that the ignition delay is smaller than the ignition delay upper limit, the combusted amount regulator 45 concludes that the fuel has been burned stably. The routine then terminates. Alternatively, if a NO answer is obtained in step S108 meaning that the ignition delay is greater than the ignition delay upper limit, the combusted amount regulator 45 concludes that the fuel has been burned unstably and increments in step S109 the number n of events of the pilot injection to be performed in each engine combustion cycle by one.

The second modification of the fuel injection control device 30 will be described below with reference to FIG. 9 which is designed to change the number n of events of the pilot injection as a function of an IMEP (Indicated Mean Effective Pressure).

Figure 9:
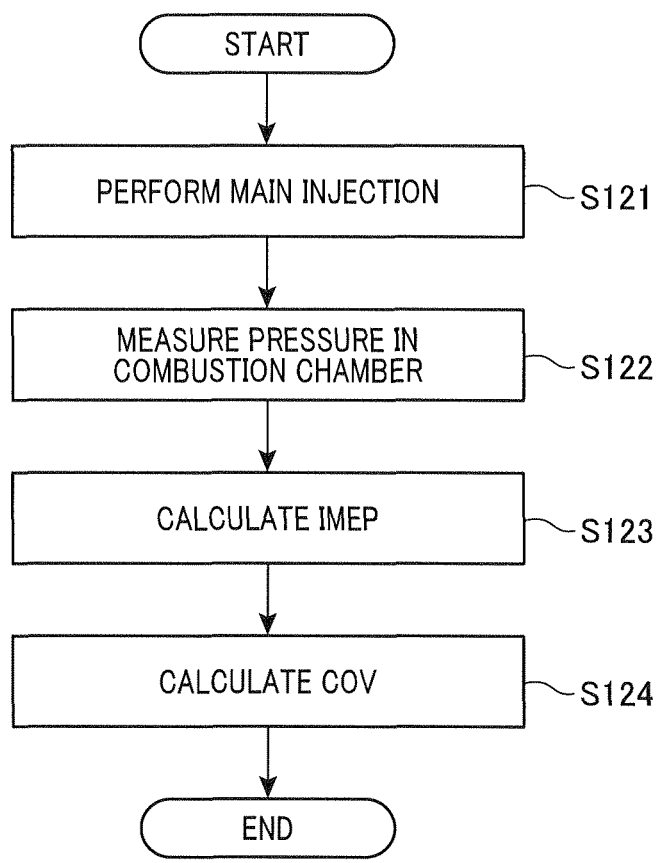
FIG. 9 is a flowchart of a fuel injection control program to be executed by the second modification of the first embodiment.

Specifically, the ECU 31 performs a sequence of operations of FIG. 9 instead of step S107 of FIG. 3. After the pilot injection of fuel is performed in step S106 of FIG. 3, the routine proceeds to step S121 wherein the injector driver 42 performs the main injection of fuel into the engine 11. The combusted amount-of-fuel calculator 43 monitors in step S122 an output of a corresponding one of the cylinder pressures 37 to derive the pressure in the combustion chamber 21 through a cycle including events of the pilot injection and the main injection. The combusted amount-of-fuel calculator 43 calculates in step S123 calculates the IMEP based on the pressure, as derived in step S122.

After the IMEP is derived in step S123, the routine proceeds to step S124 wherein the combusted amount-of-fuel calculator 43 calculates a coefficient of variance (COV), which is also called a coefficient of variation), of the IMEP, as derived in step S124. Generally, the COV of the IMEP increases as the cetane number of fuel, the temperature of the coolant of the engine 11, or the atmospheric pressure decreases. In other words, the COV increases with an increase in degree of instability of burning of fuel in the combustion chamber 21. After step S124, the routine proceeds to step S108 of FIG. 3 wherein the combusted amount range determining circuit 44 determines whether the COV, as calculated in step S124, is within a given range or not. If a YES answer is obtained meaning that the COV is in the given range, the combusted amount regulator 45 concludes that the fuel has been burned stably. The routine then terminates. Alternatively, if a NO answer is obtained in step S108 meaning that the COV is out of the given range, the combusted amount regulator 45 concludes that the fuel has been burned unstably and increments in step S109 the number n of events of the pilot injection to be performed in each engine combustion cycle by one.

Figure 10:
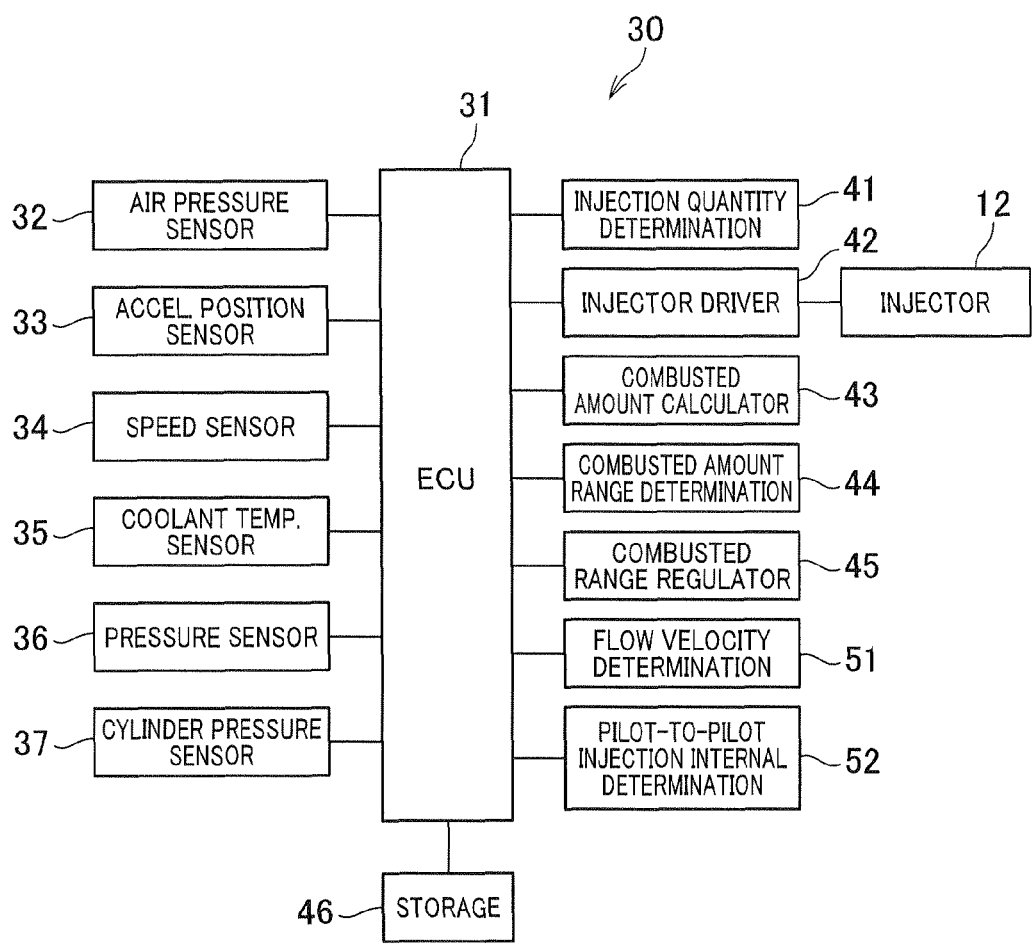
FIG. 10 is a block diagram which shows a fuel injection control device of the second embodiment.

FIG. 10 illustrates the fuel injection control device 30 of the second embodiment. The same reference numbers, as employed in the first embodiment, will refer to the same parts, and explanation thereof in detail will be omitted here.

The fuel injection control device 30 includes a flow velocity determining circuit 51 and a pilot-to-pilot injection interval determining circuit 52 which may be implemented functionally by software, that is, logical programs to be executed by the ECU 31 or hardware.

The flow velocity determining circuit 51 samples an output of the speed sensor 34 indicating the speed of the crankshaft 17 of the engine 11 and calculates a flow rate (or flow velocity) of a swirl of air inducted into the combustion chamber 21. The air sucked into each of the combustion chambers 21 through the intake path 28 generally forms a stream of air called a swirl which revolves around an axis (i.e., a longitudinal center line) of the combustion chamber 21 or the cylinder 18. The flow velocity of the swirl correlates with the flow velocity of air sucked into the combustion chamber 21. The flow velocity of air sucked into the combustion chamber 21 usually increases with an increase in speed of the engine 11. The flow velocity of the swirl, therefore, correlates with the speed of the engine 11. The flow velocity determining circuit 51, thus, calculates the flow rate or flow velocity of the swirl as a function of the speed of the engine 11, as measured by the speed sensor 34. Specifically, the flow velocity determining circuit 51 calculates an angular velocity (i.e., the flow velocity) of the swirl through a given function based on the speed of the engine 11 or by look-up using a map stored in the storage device 46. The flow velocity determining circuit 51 may also correct the flow velocity of the swirl based on the atmospheric pressure, as measured by the atmospheric pressure sensor 32.

Figure 11:
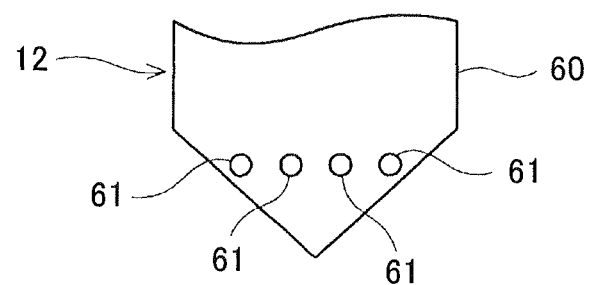
FIG. 11 is an enlarged partial view which illustrates an array of spray holes of a fuel injector.
Figure 12:
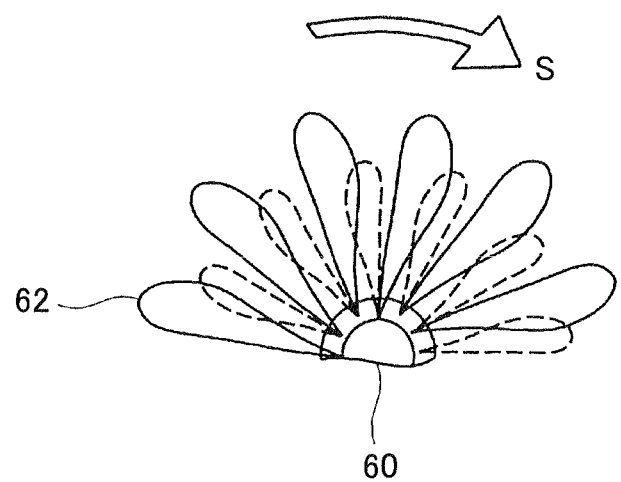
FIG. 12 is a view which illustrates transportation of sprays of fuel by a swirl of air in a combustion chamber of an engine.

The pilot-to-pilot injection interval determining circuit 52 works to control a time interval between instants of the pilot injection of fuel into each of the combustion chambers 21. The fuel injection control device 31 of this embodiment is engineered to perform two or more consecutive pilot injections of fuel into each of the combustion chambers 21 prior to the main injection. Specifically, the pilot-to-pilot injection interval determining circuit 52 determines the interval between two consecutive instants or events of the pilot injection based on the flow velocity of the swirl, as derived by the flow velocity determining circuit 51. Each of the fuel injectors 12, as illustrated in FIG. 11, has a length and is equipped with a plurality of spray holes 61 arrayed at equi-intervals away from each other in a circumferential direction of the head of the body 60. The spray holes 61 produce, as illustrated in FIG. 12, a plurality of sprays 62 of fuel which extend radially from the axis of the fuel injector 12. The pilot injection is, as described above, to spray a small amount of fuel for a short period of time, so that the fuel emitted from the fuel injector 12 is small in penetrating power, thereby causing the sprays 61 to be formed near the spray holes 61. The swirl, as indicated by an arrow S in FIG. 12, is produced within the combustion chamber 21, thereby causing the sprays 61 to turn around the axis of the fuel injector 12 in the circumferential direction thereof.

The sprays 62 are, as described above, carried by the swirl around the axis of the fuel injector 12 within the combustion chamber 12. The overlapping of the sprays 62 of fuel, as produced by a latter one of consecutive two events of the pilot injection (i.e., a later one of two consecutive pilot fuel shots), with those, as produced by the former one (i.e., an earlier one of the pilot fuel shots) is, therefore, achieved by regulating the time interval between the two events of the pilot injection. Specifically, such overlapping is accomplished by commencing the latter event of the pilot injection at the instant when the spray 62, as jetted from one of the spray holes 61 in the former event of the pilot injection, is transported by the swirl and lies on or around a line extending in alignment with the axis of another of the spray holes 61.

Figure 13:
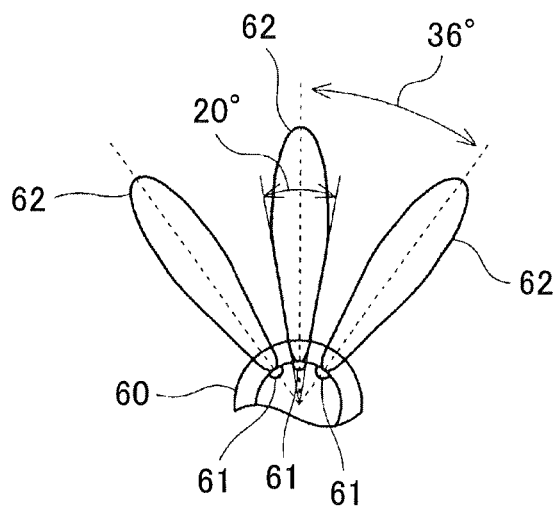
FIG. 13 is a view which illustrates a pattern of sprays of fuel in a case where a fuel injector has ten spray holes.

In the case where the fuel injector 12 has the ten spray holes 61 arranged at regular intervals in the circumferential direction of the head thereof, each adjacent two of the sprays 62 of fuel, as illustrated in FIG. 13, expand radially with long axes (i.e., longitudinal center lines) thereof separated at an angle of 36° away from each other. The interval between the sprays 62 of fuel depends upon the number of the spray holes 61 of the fuel injector 12. The pattern of each individual spray 62 of fuel jetted from the spray holes 61 of the fuel injector 12 has a spread of about 20°. Such spread angle becomes constant within as short as 0.2 msec. after start of the pilot injection in an example of FIG. 14. Each of the individual sprays 62 usually has a sufficient spread of about 15° even when the quantity of fuel sprayed in each event of the pilot injection is decreased.

Figure 14:
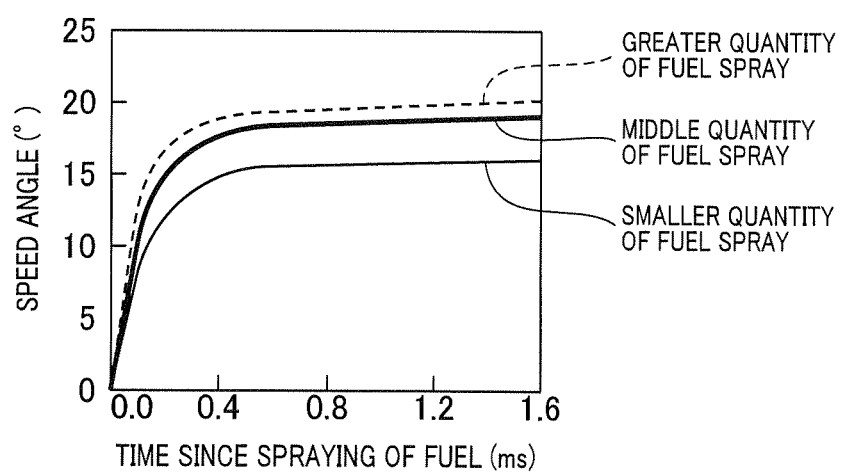
FIG. 14 is a graph which represents a relation between the time elapsed since start of spraying of fuel and a spread angle of the spray of fuel.
Figure 15:
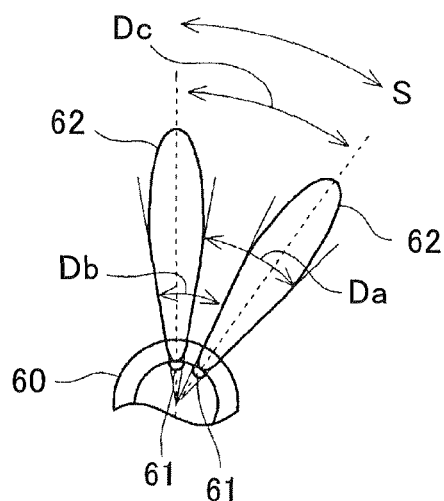
FIG. 15 is a view which demonstrates movement of a spray of fuel by a swirl of air in a combustion chamber.
Figure 16:
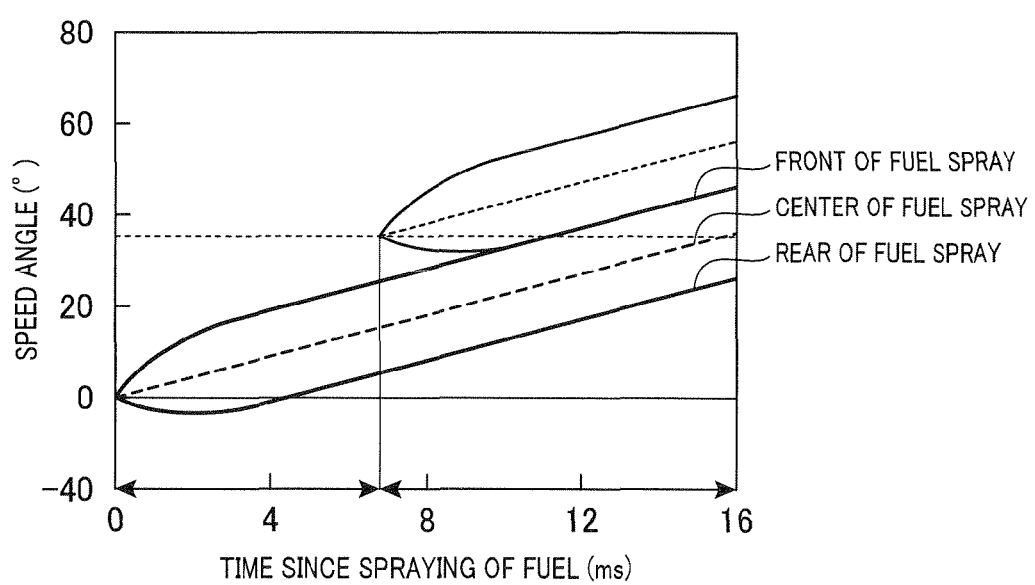
FIG. 16 is a graph which illustrates a relation between a time elapsed since start of spraying of fuel and angles through which adjacent sprays of the fuel travel.

The following discussion will refer to an example where the engine 11 is designed to have a swirl ratio of 2.2, and each of the fuel injectors 12 has the ten spray holes 61. Each of the sprays 62 of fuel is of substantially a fusiform shape. The angle through which the front side of the spray 62 which faces in an advancing direction is transported by the swirl is, as illustrated in FIG. 15, defined as Da. The angle through which the rear side of the spray 62 which faces in a direction opposite the advancing direction is transported by the swirl is defined as Db. The angle through which the longitudinal center line of the spray 62 is moved by the swirl is defined as Dc. In light of a change in spread angle of the sprays 62 with time, as illustrated in FIG. 14, the sprays 62 jetted from two of the spray holes 61 located adjacent each other in the circumferential direction of the fuel injector 12 are expected to appear in angular ranges, as indicated in FIG. 16. The time elapsed since the fuel starts to be sprayed is expressed by the angle of rotation of the crankshaft 17 of the engine 11. The overlapping of the spray 62 of fuel, as produced in the latter one of two consecutive events of the pilot injection, with that, as produced in the former one is, therefore, achieved by selecting the time interval between the two consecutive events of the pilot injection (which will also be referred to below as a pilot-to-pilot injection interval) so as to meet a relation of pilot-to-pilot injection interval=(interval between the spray holes 61–(spread angle)/angular velocity of swirl. In short, the pilot-to-pilot injection interval is controlled as a function of the flow velocity of swirl, as calculated by the flow velocity determining circuit 51.

In the example of FIGS. 15 and 16, the spread angle of each of the sprays 62 is about 20°. The overlapping of at least a portion of the spray 62 of fuel, as produced in the latter one (i.e., later one) of two consecutive events of the pilot injection, with that, as produced in the former one (i.e., earlier one) is, therefore, achieved by commencing the latter event of the pilot injection after the crankshaft 17 rotates through a minimum angle of 7° or a maximum angle of 27°. In other words, such overlapping is established by executing the latter event of the pilot injection within a time frame where the crankshaft 17 rotates 7° to 27°. The flow velocity determining circuit 51 calculates the flow velocity of the swirl using the speed of the crankshaft 17, as measured by the speed sensor 34. The pilot-to-pilot injection interval determining circuit 52 determines the interval between two consecutive events of the pilot injection as a function of the flow velocity of the swirl (i.e., the speed of the crankshaft 17).

Figure 17:
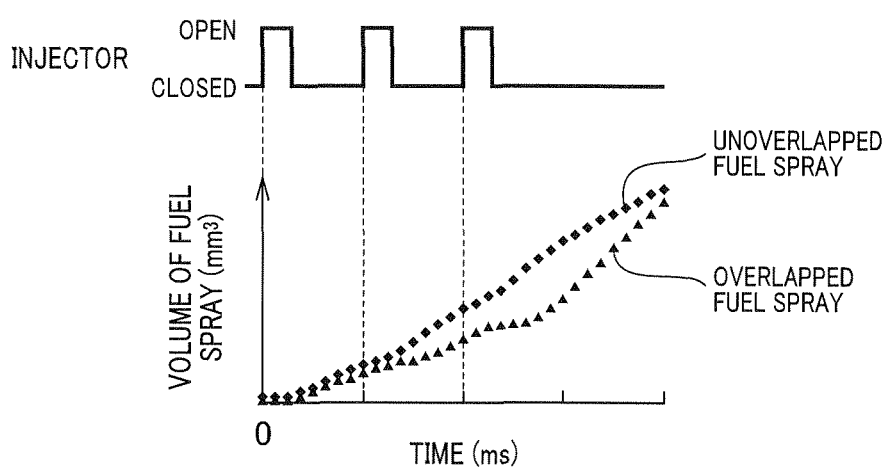
FIG. 17 is a graph which illustrates a relation between the volume of sprays of fuel and the time since start of a sequence of events of pilot injection.

The overlapping between the sprays 62 of fuel created in two consecutive events of the pilot injection in the manner, as described above, produces fuel combinations of concentrations of the sprays 62 which compensate for a lack in quantity of fuel to be sprayed in each event of the pilot injection. Each of the sprays 62 of fuel in the latter one of two consecutive events of the pilot injection is jetted toward one of the sprays 62 of fuel having been produced in the former event of the pilot injection to create an overlap therebetween. Such a spray overlap is smaller in volume than any of the sprays 62 of fuel in the two consecutive events of the pilot injection. Specifically, the sprays 62 of fuel jetted in the former event of the pilot injection spread to a certain extent until start of the latter event of the pilot injection. Each of the sprays 62 of fuel produced in the latter event of the pilot injection is emitted toward one of the spreading sprays 62 of fuel having been produced in the former event of the pilot injection, thereby creating an overlap where an air-fuel mixture is enriched. Such an overlapped spray of fuel is, therefore, as illustrated in FIG. 17, smaller in volume, but greater in density of fuel than each of the sprays 62 formed in the two consecutive events of the pilot injection. Consecutive pilot injections of fuel in the above manner, thus, produce enriched air-fuel mixtures near the spray holes 61 of each of the fuel injectors 12. This results in an increase in average equivalence ratio around the fuel injector 12 of each of the combustion chambers 21, thereby improving the ignitability of the fuel.

Figure 18:
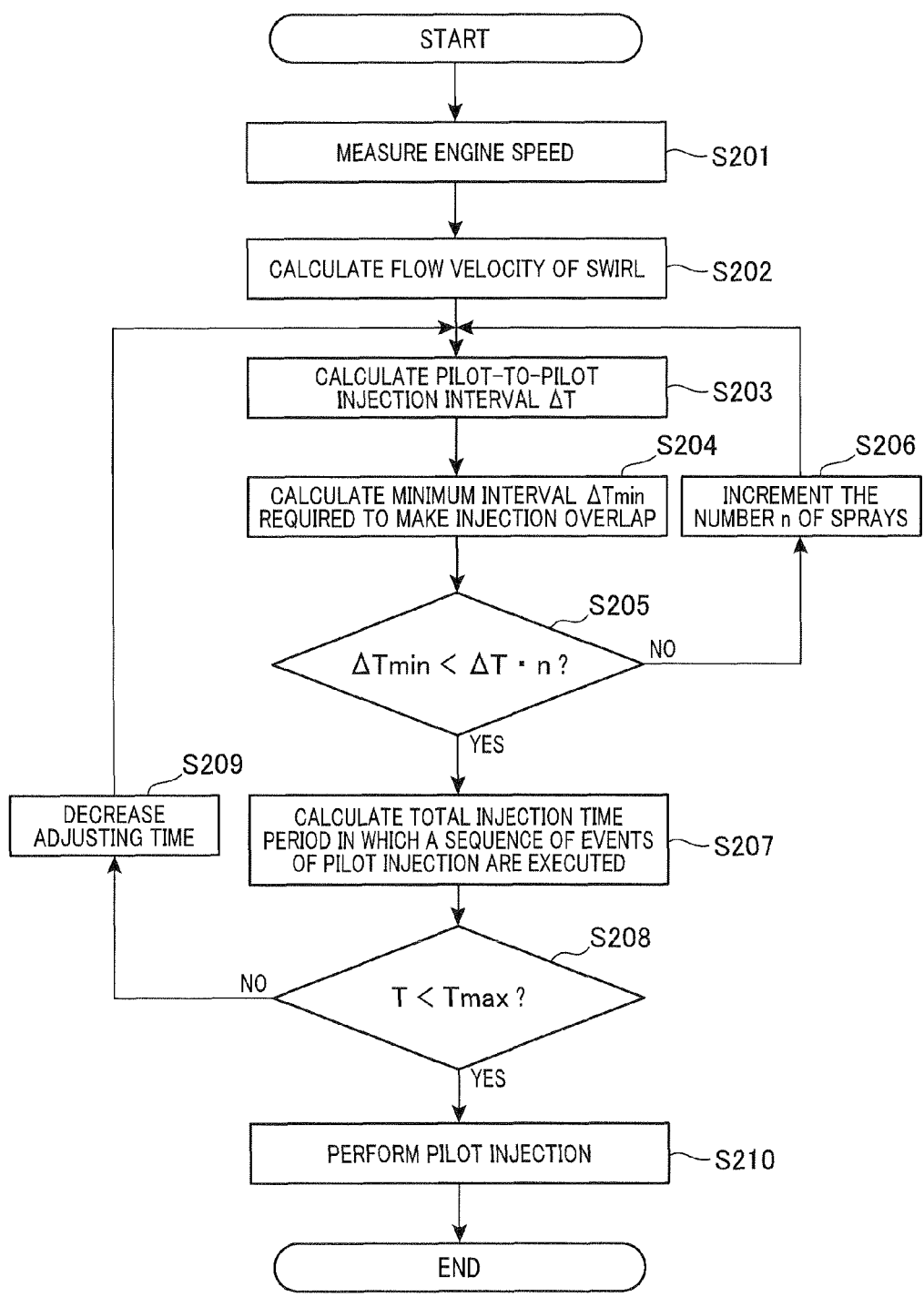
FIG. 18 is a flowchart of a fuel injection control program to be executed by a fuel injection control device of the second embodiment.

The above operations of the diesel engine system 10 of the second embodiment will be described below with reference to a flowchart of a fuel injection control program, as illustrated in FIG. 18.

The program is initiated by the ECU 31 after step S108 of FIG. 3.

First, in step S201, the flow velocity determining circuit 51 acquires an output of the speed sensor 34 indicating the speed of the crankshaft 17 of the engine 11. The routine proceeds to step S202 wherein the flow velocity determining circuit 51 calculates the flow velocity of a swirl of air inducted into the combustion chamber 21. Specifically, the flow velocity determining circuit 51 determines an angular velocity S of the swirl which correlates with the speed of rotation of the crankshaft 17.

The routine proceeds to step S203 wherein the pilot-to-pilot injection interval determining circuit 52 determines a time interval $\Delta T$ between every adjacent two of a sequence of events of the pilot injection based on the angular velocity S of the swirl, as derived in step S202. Specifically, the pilot-to-pilot injection interval determining circuit 52 calculates the injection time interval $\Delta T$ according to an equation of $\Delta T = (\theta/S - t)/n$ using the interval $6$ between every adjacent two of the spray holes 61 in the circumferential direction of the fuel injector 12, the angular velocity S of the swirl, as derived in step S202, an adjusting time t, and the number n of the sprays of fuel to be overlapped with each other. The interval $\theta$ between every adjacent two of the spray holes 61 is a known fixed value in the fuel injectors 12 and stored in the storage device 46. The adjusting time t is a given time required to adjust or correct the interval between the events of the pilot injection.

The routine then proceeds to step S204 wherein the pilot-to-pilot injection interval determining circuit 52 determines a minimum pilot-to-pilot injection interval $\Delta Tmin$ required to overlap the sprays 62 with each other based on the injection time interval $\Delta T$, as derived in step S203. Specifically, the pilot-to-pilot injection interval determining circuit 52 determines the minimum pilot-to-pilot injection interval $\Delta Tmin$ according to an equation of $\Delta Tmin = (\theta - \beta)/S$ based on the interval $6$ between every adjacent two of the spray holes 61 in the circumferential direction of the fuel injector 12, the angular velocity S of the swirl, as derived in step S202, and a spread angle $\beta$ of the sprays 62 formed by the respective spray holes 61.

The routine proceeds to step S205 wherein it is determined whether the product of the injection time interval $\Delta T$, as derived in step S203, and the number n of the sprays 62 of fuel is greater than the minimum pilot-to-pilot injection interval $\Delta Tmin$, as derived in step S204, or not (i.e., $\Delta Tmin < \Delta T \times n$ ?). If a NO answer is obtained (i.e., $\Delta T \times n \leq \Delta Tmin$), then the routine proceed to step S206 wherein the number n of the sprays 62 which are to be overlapped with each other is incremented by one. Specifically, the pilot-to-pilot injection interval determining circuit 52 increases the number n of the sprays 62 of fuel to be overlapped each other in a sequence of events of the pilot injection by one. The condition of $\Delta T \times n \leq \Delta Tmin$ means that each of the sprays 62 of fuel to be produced in the latter event of the pilot injection will advance between adjacent two of the sprays 62 of fuel produced in the former event of the pilot injection so that it does not overlap with any of them. The pilot-to-pilot injection interval determining circuit 52, thus, increase the number n of the sprays 62 of fuel to be jetted in the latter event of the pilot injection so that they will overlap with the sprays 62 of fuel formed in the former event of the pilot injection. After step S206, the routine returns back to step S203.

Alternatively, if a YES answer is obtained in step S205 meaning that the product of the injection time interval $\Delta T$, as derived in step S203, and the currently set number n of the sprays 62 of fuel is greater than the minimum pilot-to-pilot injection interval $\Delta Tmin$, as derived in step S204, then the routine proceeds to step S207 wherein a total injection time period T that is a length of time between the first event of the pilot injection and the $n^{th}$ event (i.e., the final event) of the pilot injection to be executed in each engine combustion cycle is calculated. Specifically, the pilot-to-pilot injection interval determining circuit 52 multiplies the injection time interval $\Delta T$ by the number n of events of the pilot injection to derive the total injection time period T (i.e., $T = \Delta T \times n$)

After the pilot-to-pilot injection interval determining circuit 52 determines the total injection time period T in step S207, the routine proceeds to step S208 wherein it is determined whether the total injection time period T is less than a maximum time period (i.e., a time limit) Tmax or not. The maximum time period Tmax is a maximum permissible time period in which a sequence of events of the pilot injection is permitted to be executed in each engine combustion cycle (i.e., per stroke) and stored in the storage device 46. When the total injection time period T exceeds the maximum time period Tmax, it will result in too short a time interval between the final event of the pilot injection and start of the main injection to ensure the stability in burning of fuel in the engine 11.

If a NO answer is obtained in step S208 meaning that the total injection time period T is longer than the maximum time period Tmax, then the routine proceeds to step S209 wherein the adjusting time t is decreased. Specifically, the pilot-to-pilot injection interval determining circuit 52 decreases the adjusting time t used in determining the injection time interval $\Delta T$ so that the total injection time period T may be less than the maximum time period Tmax. The routine then returns back to step S203.

Alternatively, if a YES answer is obtained in step S208 meaning that the total injection time period T lies in the maximum time period Tmax, then the routine proceeds to step S210 wherein the fuel injector 12 is driven to execute the event of the pilot injection of fuel.

The fuel injection control device 30 of the second embodiment is, as described above, engineered to control the interval between two or more events of the pilot injection to be executed. Specifically, the pilot-to-pilot injection interval determining circuit 52 works to control the interval between the events of the pilot injection as a function of the flow velocity (i.e., the angular velocity) of the swirl formed in the combustion chamber 21 so as to create overlaps between the sprays 62 of fuel, as emitted from the fuel injector 12 in different events of the pilot injection in order to produce an enriched air-fuel mixture around the fuel injector 12, thereby improving both the ignitability of fuel and the combusted amount of fuel in the pilot injection events.

The fuel injection control device 30 of the second embodiment, as described above, serves to overlap each of the sprays 62 to be jetted from all the spray holes 61 of each of the fuel injectors 12 with a circumferentially adjacent one of the sprays 62 having previously been jetted from all the spray holes 61, but may alternatively be designed to overlap the sprays 62 of fuel with each other which are jetted from every alternate or every third or more spray holes 61 based on the flow velocity of the swirl. Specifically, the fuel injection control device 30 may overlap each of the sprays 62 of fuel emitted in a latter one of every two consecutive events of the pilot injection with one of the sprays 62 of fuel which has been emitted in the former event of the pilot injection from the next spray hole 61 but one or more, that is, from the spray hole 61 located at a distance of two or more intervals between the spray holes 61 from one of the spray holes 61 from which the spray 61 has been emitted in the former event of the pilot injection. Further, the fuel injection control device 30 may also be designed to control the interval between two of a sequence of events of the pilot injection in which the sprays 62 of fuel to be overlapped with each other are produced. For instance, in the case where three consecutive events of the pilot injection are to be executed, the fuel injection control device 30 may overlap each of the sprays 62 of fuel emitted in the third event of the pilot injection with one of the sprays 62 of fuel which has been emitted in the first event of the pilot injection.

When the speed of the engine 11 is in a low speed range, the flow velocity of the swirl in each of the combustion chambers 21 is usually small. This causes the spray 62 of fuel emerging from each of the spray holes 61 of the fuel injector 12 to stay near the spray hole 61 without being moved by the swirl toward the other spray holes 61. The pilot-to-pilot injection interval determining circuit 52 may be designed to determine whether the speed of the crankshaft 17 of the engine 11, as measured by the speed sensor 34, is greater than or equal to a given border speed or not which is set between the low speed range and a high speed range, in other words, whether the engine 11 is in an operating condition or not where the flow velocity of the swirl in the combustion chamber 21 is in a high speed range where each of the sprays 62 of fuel emitted from the spray holes 61 is moved by the swirl until another of the spray holes 61. The border speed is predetermined based on characteristics of the engine 11. The pilot-to-pilot injection interval determining circuit 52 may determine whether the engine 11 is in the above operating condition or not based on the flow velocity of the swirl, as calculated by the flow velocity determining circuit 51, instead of the speed of the crankshaft 17.

When it is determined that the speed of the engine 11 is less than the border speed, that is, lies in the low speed range, the pilot-to-pilot injection interval determining circuit 52 may control the pilot-to-pilot injection interval so as to overlap the spray 62 of fuel to be jetted from each of the spray holes 61 of the fuel injector 12 with that having emerged from the same one of the spray holes 61. Specifically, when the speed of the engine 11 is in the low speed range, the spray 62 of fuel from one of the spray holes 61 usually stays near the one of the spray holes 61 without being transported by the swirl over another of the spray holes 61. The pilot-to-pilot injection interval determining circuit 52 may, therefore, set the pilot-to-pilot injection interval to be short to overlap the spray 62 of fuel to be jetted from each of the spray holes 61 in a latter one of two consecutive events of the pilot injection with that having being produced by the same spray hole 61 in the former event of the pilot injection for creating enriched air-fuel mixtures around the fuel injector 12.

When it is determined that the speed of the engine 11 is in the high speed range, the pilot-to-pilot injection interval determining circuit 52, like in the above embodiment, overlap the spray 62 of fuel to be jetted from each of the spray holes 61 in the latter event of the pilot injection with that having being produced by another of the spray holes 61 in the former event of the pilot injection. The pilot-to-pilot injection interval determining circuit 52 may be designed to divide the speed of the engine 11 into three ranges: a low speed range, an intermediate speed range, and a high speed range and set the pilot-to-pilot injection interval to be short to overlap the spray 62 of fuel to be jetted from each of the spray holes 61 in the earlier pilot injection with that having being produced by the same spray hole 61 in the later pilot injection when the speed of the engine 11 is either in the low speed range or the intermediate speed range.

Figure 19:
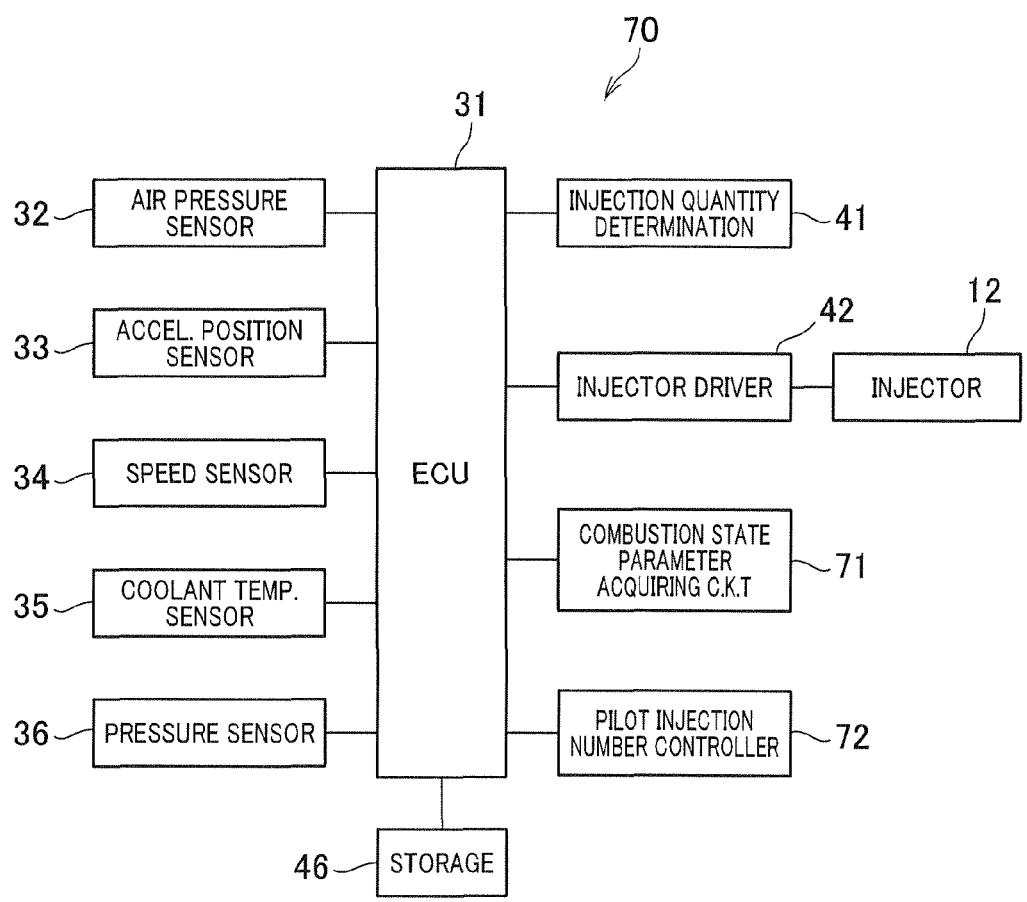
FIG. 19 is a schematic diagram which illustrates a fuel injection control device of the third embodiment.

FIG. 19 illustrates the fuel injection control device 70 of the diesel engine system 10 of the third embodiment. The same reference numbers, as employed in the first embodiment, will refer to the same parts, and explanation thereof in detail will be omitted here.

The fuel injection control device 70 is equipped with the ECU 31. The ECU 31 is coupled electrically with the atmospheric pressure sensor 32, the accelerator position sensor 33, the speed sensor 34, the coolant temperature sensor 35, and the pressure sensor 36.

The ECU 31 executes computer programs to functionally construct the injection quantity calculator 41, the injector driver 42, the combustion state parameter acquiring circuit 71, and the pilot injection number controller 72. The ECU 31 is also connected electrically to the storage device 46. The ECU 31 does not have the cylinder pressure sensor 37 used in the first and second embodiments. The injection quantity calculator 41, the injector driver 42, the combustion state parameter acquiring circuit 71, and the pilot injection number controller 72 may alternatively be constructed by hardware.

The combustion state parameter acquiring circuit 71 works to acquire parameters representing a combustion state of fuel sprayed from each of the fuel injectors 12 into the combustion chamber 21. Specifically, the combustion state parameter acquiring circuit 71 measures the atmospheric pressure and the temperature of coolant of the engine 11 through the atmospheric pressure sensor 32 and the coolant temperature sensor 35 as combustion state parameters indicating the combustion state of fuel in the engine 11.

The pilot injection number controller 72 serves as a stable combustion determining circuit to determine whether the combustion state parameters (i.e., the atmospheric pressure and the temperature of coolant of the engine 11) lie within given stable combustion ranges, respectively or not and controls the number n of a sequence of events of the pilot injections to be executed in each engine combustion cycle. Specifically, the pilot injection number controller 72 determines the number n of events of the pilot injection by look-up using a map, as stored in the storage device 46. When the atmospheric pressure is low or the temperature of coolant is low, the ignitability of fuel sprayed in the pilot injection event is usually thought of as being low. For instance, when the engine 11 is operating at a high altitude or the temperature of coolant is still low immediately after the diesel engine system 10 is started, the combustion state of fuel in the combustion chamber 21 is usually bad. The pilot injection number controller 72, thus, determines whether the combustion state parameters (i.e., the atmospheric pressure and the temperature of coolant of the engine 11) lie within the stable combustion ranges or not and sets the number n of events of the pilot injections required to establish the stability of burning of fuel in the engine 11. The storage device 46 stores therein the map listing a relation of a target number of events of the pilot injection with the combustion state parameters (i.e., the atmospheric pressure and the temperature of coolant of the engine 11).

Figure 20:
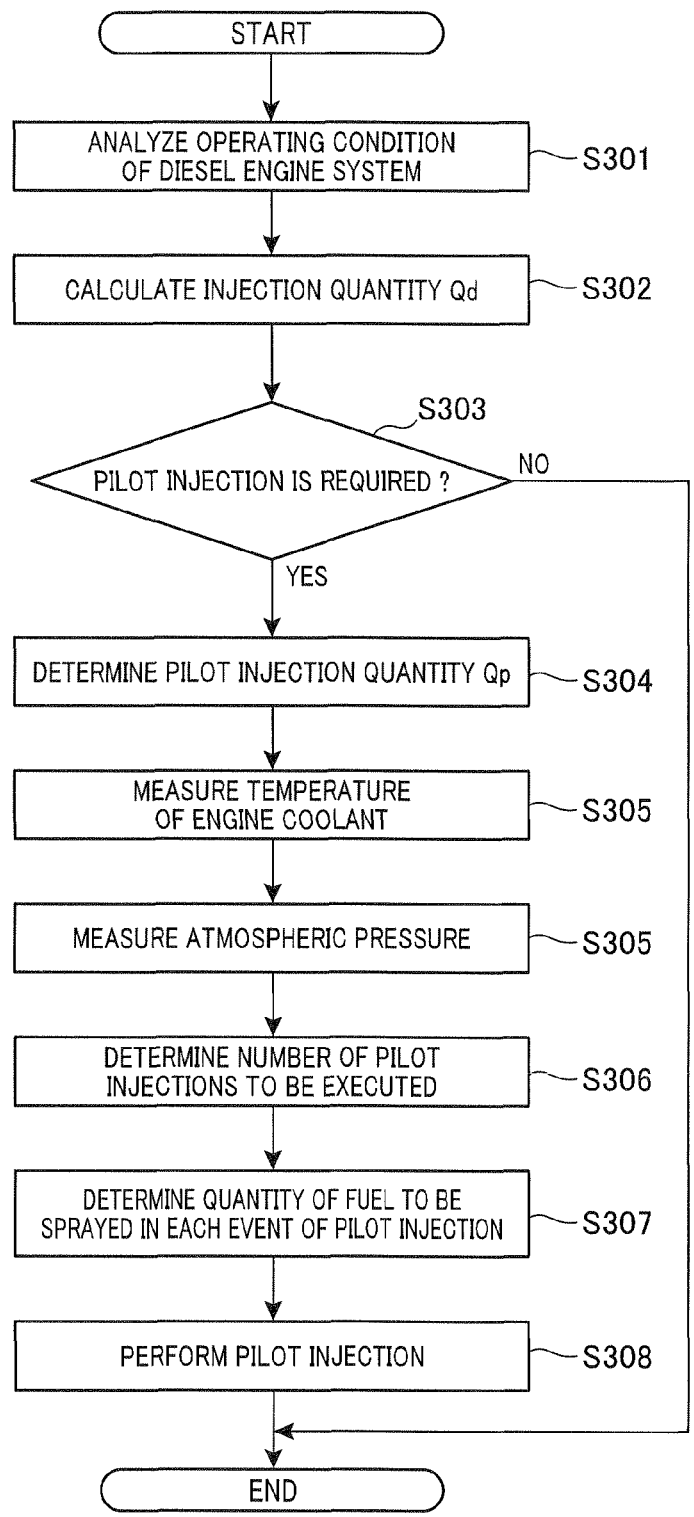
FIG. 20 is a flowchart of a fuel injection control program to be executed by a fuel injection control device of the third embodiment.

The above operations of the fuel injection control device 70 of the third embodiment will be described below with reference to a flowchart of a fuel injection control program, as illustrated in FIG. 20. Explanation of operations similar to those in the first embodiment will be omitted in detail here.

Upon start of the diesel engine system 10, the ECU 31 initiates the program.

First, in step S301, the ECU 31 samples, like in step S101, the operating condition of the diesel engine system 10 at a regular interval.

The routine proceeds to step S302 wherein the injection quantity calculator 41 determines the target injection quantity Qd of fuel based on the operating condition of the diesel engine system 10, as derived in step S301, in the same manner as described in step S102.

The routine then proceeds to step S303 wherein it is determined whether it is now required to perform the pilot injection of fuel or not. For instance, when the diesel engine system 10 is operating at a low load condition, the injection quantity calculator 41 decides that it is unnecessary to perform the pilot injection of fuel.

If a YES answer is obtained in step S303 meaning that the pilot injection of fuel needs to be executed, then the routine proceeds to step S304 wherein the injection quantity calculator 41 determines the pilot-injection quantity Qp of fuel to be sprayed in the event of the pilot injection in the same manner as in step S104. The routine proceeds to step S305 wherein the combustion state parameter acquiring circuit 71 measures the temperature of coolant of the engine 11 through the coolant temperature sensor 35. The routine proceeds to step S306 wherein the combustion state parameter acquiring circuit 71 also measures the atmospheric pressure through the atmospheric pressure sensor 32. If a NO answer is obtained in step S303 meaning that the pilot injection does not need to be executed, then the routine terminates.

After step S306, the routine proceeds to step S307 wherein the pilot injection number controller 72 sets the number n of events of the pilot injections to be executed prior to each event of the main injection of fuel. Specifically, the pilot injection number controller 72 determines the number n of events of the pilot injection by look-up using the map, as stored in the storage device 46, in relation to the temperature of coolant of the engine 11, as derived in step S305, and the atmospheric pressure, as derived in step S306.

The routine proceeds to step S308 wherein the injection quantity calculator 41 divides the pilot-injection quantity Qp, as derived in step S304, by n that is the number of events of the pilot injection, as determined in step S307, to calculate the pilot-injection quantity Qpx per event of the pilot injection. The routine proceeds to step S309 wherein the injector driver 42 opens each of the fuel injectors 12 to spray the pilot-injection quantity Qpx, as determined by the injection quantity calculator 41. Specifically, the injector driver 42 outputs the drive signal to the fuel injector 12 to open the spray hole for a period of time corresponding to the pilot-injection quantity Qpx, thereby spraying the fuel into the combustion chamber 21.

As described above, the fuel injection control device 70 works to control the number n of a sequence of events of the pilot injection to be executed in each engine combustion cycle as a function of the atmospheric pressure and/or the temperature of coolant of the engine 11, thereby ensuring a desired degree of ignitability of fuel in the event of the pilot injection regardless of the operating condition of the diesel engine system engine 10.

The ECU 31 uses the map to determine the number n of events of the pilot injection in relation to the atmospheric pressure and/or the temperature of coolant of the engine 11, thus enabling the stability of burning of fuel to be achieved with a simple structure of the fuel injection control device 30.

Figure 21:
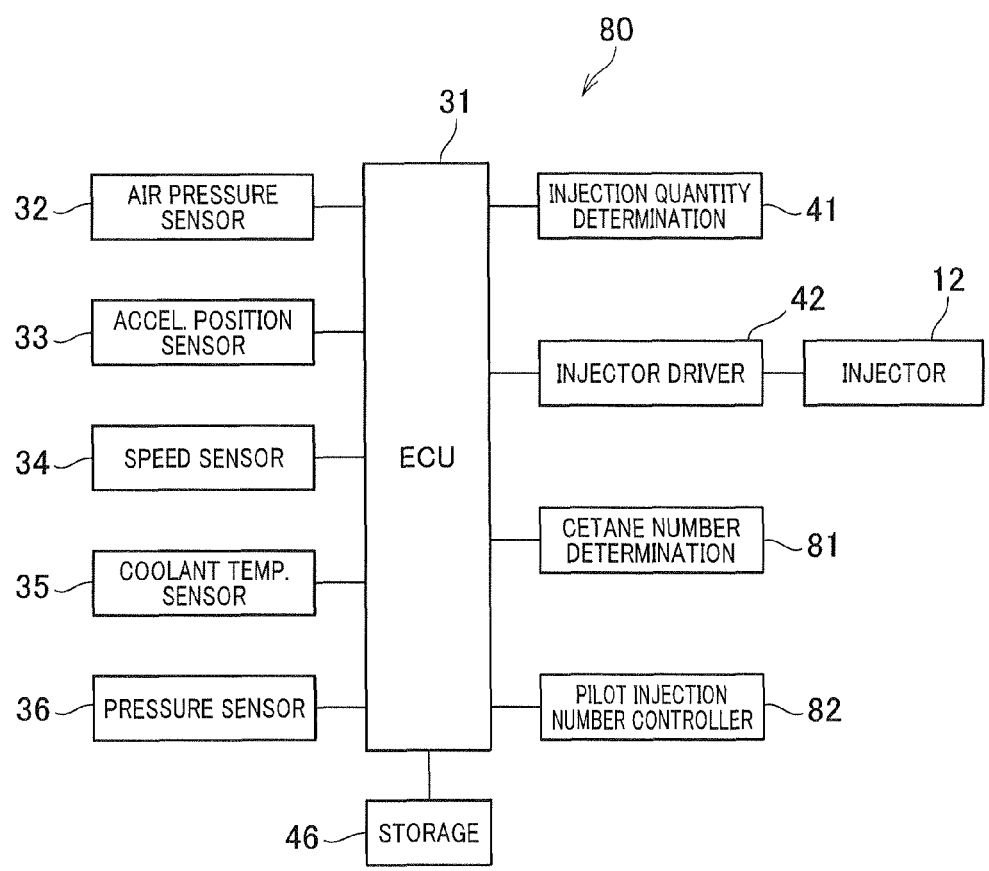
FIG. 21 is a schematic diagram which illustrates a fuel injection control device of the fourth embodiment.

FIG. 21 illustrates the fuel injection control device 80 of the diesel engine system 10 of the fourth embodiment. The same reference numbers, as employed in the above embodiments, will refer to the same parts, and explanation thereof in detail will be omitted here.

The fuel injection control device 80 is equipped with the ECU 31. The ECU 31 is coupled electrically with the atmospheric pressure sensor 32, the accelerator position sensor 33, the speed sensor 34, the coolant temperature sensor 35, and the pressure sensor 36.

The ECU 31 executes computer programs to functionally construct the injection quantity calculator 41, the injector driver 42, the cetane number determining circuit 81, and the pilot injection number controller 82. The ECU 31 is also coupled electrically to the storage device 46. The ECU 31 does not has the cylinder pressure sensor 37 used in the first and second embodiments. The injection quantity calculator 41, the injector driver 42, the cetane number determining circuit 81, and the pilot injection number controller 82 may alternatively be constructed by hardware.

The cetane number determining circuit 81 works to calculate the cetane number of fuel to be sprayed from each of the fuel injectors 12 into the combustion chamber 21 in a manner, as described later in detail. Usually, the combustion state of fuel depends upon the cetane number thereof. In other words, the combustion state of fuel correlates with the cetane number thereof and is improved with an increase in cetane number of the fuel. The cetane number determining circuit 81 derives the cetane number of fuel as a combustion state parameter.

Figure 22:
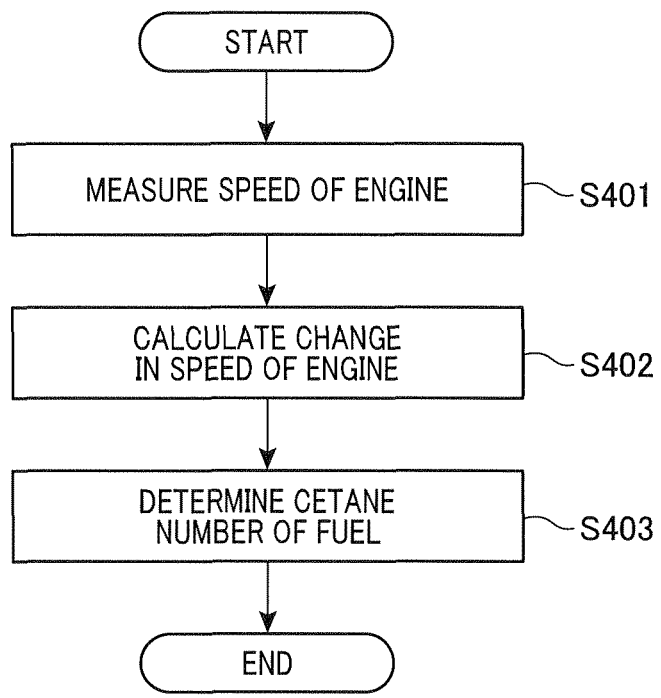
FIG. 22 is a flowchart of a cetane number determining program to be executed by the fuel injection control device of FIG. 21.

FIG. 22 is a flowchart of a cetane number calculating program to be executed by the cetane number determining circuit 81. The program is performed in parallel to and asynchronously with a fuel injection control program, as described later in detail.

When a given cetane number decision time is reached, the routine proceeds to step S401 wherein the cetane number determining circuit 81 measures the speed of the engine 11 through the speed sensor 34. The cetane number decision time is determined as having been reached, for example, when the engine 11 is in an idle mode of operation.

After the speed of the engine 11 is measured, the routine proceeds to step S402 wherein the cetane number determining circuit 81 calculate a change in speed of the engine 11. Specifically, the cetane number determining circuit 81 retards the injection timing when the fuel is to be injected into the engine 11 while keeping the quantity of fuel to be sprayed from the fuel injector 12 and then monitors a change in speed of the engine 11 through the speed sensor 34. Usually, the retardation of the injection timing results in instability of burning of fuel, which will lead to a change in speed of the engine 11. The degree of such instability increases with a decrease in cetane number of the fuel. The routine proceeds to step S403 wherein the cetane number determining circuit 81 calculates the cetane number of fuel as a function of the change in speed of the engine 11, as derived in step S402, and stores it in the storage device 46.

The pilot injection number controller 82 serves as a stable combustion determining circuit to determine whether the combustion state parameter (i.e., the cetane number of fuel), as derived in the cetane number determining circuit 81, is in a given stable combustion range or not and sets the number n of a sequence of events of the pilot injection to be executed in each engine combustion cycle. Specifically, the pilot injection number controller 82 determines the number n of events of the pilot injection by look-up using a map stored in the storage device 46. For instance, when the cetane number of fuel is low, the pilot injection of fuel from the fuel injector 12 hardly contributes to improvement of ignitability of the fuel in the combustion chamber 21, so that the combustion state of the fuel is bad. Therefore, the pilot injection number controller 82 determines whether the cetane number of fuel, as derived by the cetane number determining circuit 81, is in the stable combustion range where the fuel sprayed in the event of the pilot injection is to burn stably in the combustion chamber 21 or not and sets the number n of a sequence of events of the pilot injection to be executed in each engine combustion cycle. The storage device 46 stores therein the map listing a relation of the number n of events of the pilot injection with the combustion state parameters (i.e., the cetane number of fuel).

Figure 23:
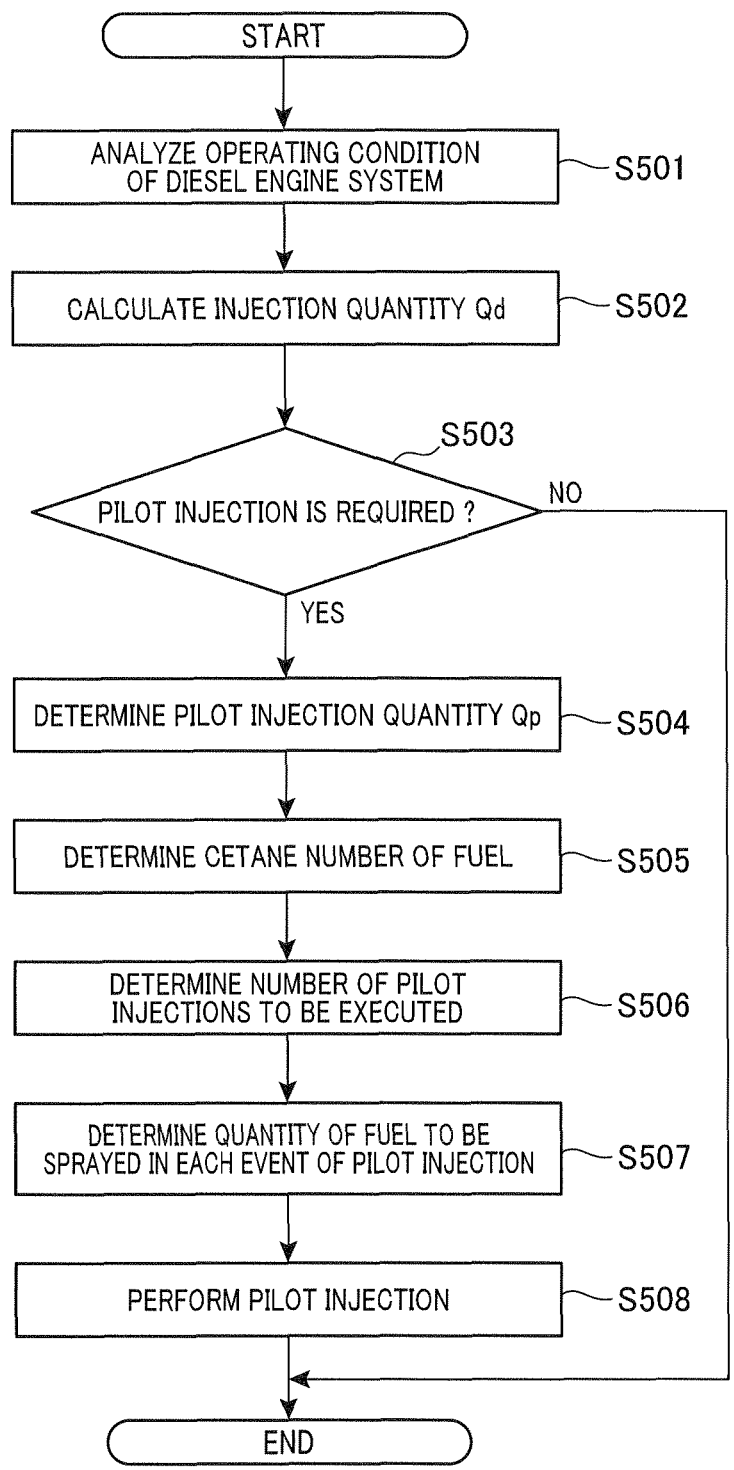
FIG. 23 is a flowchart of a fuel injection control program to be executed by the fuel injection control device of FIG. 21.

The above operations of the fuel injection control device 80 of the fourth embodiment will be described below with reference to a flowchart of a fuel injection control program, as illustrated in FIG. 23. Explanation of operations similar to those in the third embodiment will be omitted in detail here.

Upon start of the diesel engine system 10, the ECU 31 initiates the program.

First, in step S501, the ECU 31 samples, like in step S101, the operating condition of the diesel engine system 10 at a regular interval.

The routine proceeds to step S502 wherein the injection quantity calculator 41 determines the target injection quantity Qd of fuel based on the operating condition of the diesel engine system 10, as derived in step S501, in the same manner as described in step S102.

The routine then proceeds to step S503 wherein it is determined whether it is now required to perform the pilot injection of fuel or not. For instance, when the diesel engine system 10 is operating at a low load condition, the injection quantity calculator 41 decides that it is unnecessary to perform the pilot injection of fuel.

If a YES answer is obtained in step S503 meaning that the pilot injection of fuel needs to be executed, then the routine proceeds to step S504 wherein the injection quantity calculator 41 determines the pilot-injection quantity Qp of fuel to be sprayed in the event of the pilot injection in the same manner as in step S104. The routine proceeds to step S505 wherein the cetane number determining circuit 81 reads the cetane number of fuel out of the storage device 46. The cetane number of the fuel is, as described above, calculated in the flowchart of FIG. 22 and stored in the storage device 46. If a NO answer is obtained in step S503 meaning that the pilot injection needs not be executed, then the routine terminates.

After step S505, the routine proceeds to step S506 wherein the pilot injection number controller 82 sets the number n of events of the pilot injections to be executed prior to each event of the main injection of fuel. Specifically, the pilot injection number controller 82 determines the number n of events of the pilot injection by look-up using a map, as stored in the storage device 46, in relation to the cetane number of fuel, as derived in step S505.

The routine proceeds to step S507 wherein the injection quantity calculator 41 divides the pilot-injection quantity Qp, as derived in step S504, by n that is the number of events of the pilot injection, as determined in step S506, to calculate the pilot-injection quantity Qpx per event of the pilot injection. The routine proceeds to step S508 wherein the injector driver 42 opens each of the fuel injectors 12 to spray the pilot-injection quantity Qpx, as determined by the injection quantity calculator 41. Specifically, the injector driver 42 outputs the drive signal to the fuel injector 12 to open the spray hole for a period of time corresponding to the pilot-injection quantity Qpx, thereby spraying the fuel into the combustion chamber 21.

As described above, the fuel injection control device 80 works to control the number n of a sequence of events of the pilot injection to be executed in each engine combustion cycle as a function of the cetane number of fuel used in the diesel engine system 10, thereby ensuring a desired degree of ignitability of fuel in the event of the pilot injection regardless of the cetane number of the fuel.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For instance, the diesel engine system 10 may be designed to have a combination of the fuel injection control device 30, 70, and 80.

What is claimed is:

1. A fuel injection control system for an internal combustion engine equipped with a combustion chamber and a fuel injector installed in the combustion chamber, comprising:
   an injection quantity calculator which calculates a quantity of fuel to be sprayed from the fuel injector into the combustion chamber;
   an injector driver which drives an operation of the fuel injector to spray the quantity of fuel, as calculated by the injection quantity calculator, in at least one event of pilot injection and in an event of main injection following the event of the pilot injection;
   a combustion state parameter acquiring circuit which acquires a combustion state parameter representing a combustion state of the fuel within the combustion chamber which has been sprayed in the event of the pilot injection;
   a stable combustion determining circuit which determines whether the combustion state parameter, as acquired by the combustion state parameter acquiring circuit, lies in a stable combustion range where the fuel is to burn stably or not; and
   a combusted amount controller which changes at least one of a number of events of the pilot injection to be executed prior to the event of the main injection and a quantity of the fuel to be sprayed in each event of the pilot injection when the stable combustion determining circuit determines that the combustion state parameter is out of the stable combustion range.

2. A fuel injection control system as set forth in claim 1, wherein when the stable combustion determining circuit determines that the combustion state parameter is out of the stable combustion range, the combusted amount controller increases the number of events of the pilot injection to be executed and decreases the quantity of the fuel to be sprayed in each event of the pilot injection.

3. A fuel injection control system as set forth in claim 1, wherein the combustion state parameter acquiring circuit is equipped with a combusted amount determining circuit to determine a combusted amount of the fuel sprayed in the event of the pilot injection into the combustion chamber as the combustion state parameter.

4. A fuel injection control system as set forth in claim 1, wherein the injector driver controls the operation of the fuel injector to execute a first event and a second event of the pilot injection of the fuel into the combustion chamber prior to the event of the main injection, and further comprising a speed sensor which measures a speed of the engine, a flow velocity determining circuit which determines a flow velocity of a swirl of air sucked into the combustion chamber based on the speed of the engine, as measured by the speed sensor, and a pilot-to-pilot injection interval controller which controls a time interval between the first and second events of the pilot injection based on the flow velocity of the swirl, as determined by the flow velocity determining circuit, so as to overlap a spray of the fuel, as produced by the second event of the pilot injection, with a spray of the fuel, as produced by the first event of the pilot injection.

5. A fuel injection control system as set forth in claim 4, wherein the fuel injector has a length and is equipped with a plurality of spray holes which are arrayed circumferentially around the length and produce sprays of the fuel radially, and wherein the pilot-to-pilot injection interval controller works to overlap the sprays of the fuel, as produced by the second event of the pilot injection, with those, as produced by the first event of the pilot injection.

6. A fuel injection control system as set forth in claim 4, wherein the fuel injector has a length and is equipped with a plurality of spray holes which are arrayed circumferentially around the length and produce sprays of the fuel radially, and wherein when the speed of the engine, as measured by the speed sensor, is lower than a given value, the pilot-to-pilot injection interval controller works to control the time interval between the first and second events of the pilot injection so as to overlap the spray of the fuel to be jetted from each of the spray holes of the fuel injector in the second event of the pilot injection with that having emerged from the same one of the spray holes in the first event of the pilot injection.

7. A fuel injection control system as set forth in claim 5, wherein when the speed of the engine, as measured by the speed sensor, is higher than the given value, the pilot-to-pilot injection interval controller works to control the time interval between the first and second events of the pilot injection so as to overlap the spray of the fuel to be jetted from each of the spray holes of the fuel injector in the second event of the pilot injection with that having been emitted in the first event of the pilot injection from one of the spray holes which is different from that in the first event of the pilot injection.

* * * * *